(12) United States Patent
Jalan et al.

(10) Patent No.: US 7,159,211 B2
(45) Date of Patent: Jan. 2, 2007

(54) METHOD FOR EXECUTING A SEQUENTIAL PROGRAM IN PARALLEL WITH AUTOMATIC FAULT TOLERANCE

(75) Inventors: Abhinav Jalan, Bulandshahr (IN); Retesh Chadha, New Delhi (IN)

(73) Assignee: Indian Institute of Information Technology, Uttar Pradesh (IN)

( * ) Notice: Subject to any disclaimer, the term of this patent is extended or adjusted under 35 U.S.C. 154(b) by 519 days.

(21) Appl. No.: 10/650,041

(22) Filed: Aug. 28, 2003

(65) Prior Publication Data

US 2004/0172626 A1    Sep. 2, 2004

(30) Foreign Application Priority Data

Aug. 29, 2002   (IN)   .......................... 884/DEL/2002

(51) Int. Cl.
G06F 9/44    (2006.01)
G06F 11/00   (2006.01)
G06F 15/00   (2006.01)
G06F 13/00   (2006.01)
G06F 9/46    (2006.01)

(52) U.S. Cl. ...................... 717/149; 717/124; 717/126; 714/25; 714/34; 712/31; 712/32; 719/316; 719/330; 718/102; 718/106

(58) Field of Classification Search ................ 717/149, 717/124, 126, 127, 108, 116; 714/25, 34; 712/31, 32; 719/316, 330; 718/102, 106
See application file for complete search history.

(56) References Cited

U.S. PATENT DOCUMENTS

| 5,021,945 | A | * | 6/1991  | Morrison et al. ........... 712/216 |
| 5,088,034 | A |   | 2/1992  | Ihara et al. |
| 5,404,521 | A |   | 4/1995  | Murray |
| 5,452,461 | A |   | 9/1995  | Umekita et al. |
| 5,832,272 | A |   | 11/1998 | Kalantery |
| 5,860,009 | A |   | 1/1999  | Uchihira et al. |
| 5,999,729 | A |   | 12/1999 | Tabloski, Jr. et al. |
| 5,999,987 | A |   | 12/1999 | O'Farrell et al. |
| 6,205,465 | B1| * | 3/2001  | Schoening et al. ......... 718/102 |
| 6,253,371 | B1|   | 6/2001  | Iwasawa et al. |
| 6,298,370 | B1| * | 10/2001 | Tang et al. .................. 718/102 |
| 6,311,265 | B1|   | 10/2001 | Beckerle et al. |
| 6,505,228 | B1| * | 1/2003  | Schoening et al. ......... 718/106 |
| 6,684,261 | B1| * | 1/2004  | Orton et al. ................. 719/328 |
| 6,769,124 | B1| * | 7/2004  | Schoening et al. ......... 719/316 |
| 6,959,372 | B1| * | 10/2005 | Hobson et al. ............. 711/168 |
| 7,007,024 | B1| * | 2/2006  | Zelenka ......................... 707/8 |

OTHER PUBLICATIONS

TITLE: Task concurrency management methodology to schedule the MPEG4 IM1 player on a highly parallel processor platform, author: Wong et al, ACM, 2001.*

(Continued)

Primary Examiner—Chameli C. Das
(74) Attorney, Agent, or Firm—Sidley Austin LLP

(57) ABSTRACT

The present invention provides system and methods for executing a sequential in parallel. Parallel procedures, specified in the program, are executed as parallel slave processes. A process when actually accessing a 'synchronous object' that does not contain the data value same as in program's sequential run gets blocked till the right value is received. Object value transfer takes place through an ownership queue. Synchronization over referred objects along with run-time alterations in the linkage structure of the objects is also supported. In the event of a fault, aborted processes are rescheduled and redundancy in data storage is avoided.

25 Claims, 27 Drawing Sheets

OTHER PUBLICATIONS

TITLE: ADA for closely coupled multiprocessor targets, author: Cholerton, ACM, 1989.*

TITLE: Object Distribution in Orca using Compile-Time and Run-Time Techniques, author: Bal et al, ACM, 1993.*

TITLE: Low-Cost Task Scheduling for Distributed -Memory Machines, author: Radulescu et al, IEEE, Jun. 2002.*

J.M. Jezequel et al., A Parallel Execution Environment for a Sequential Object Oriented Language; 1992 ACM, pp. 368-376.

B.R. Bryant et al., Automatic Parallelization of Object-Oriented Programming Languages Using Tuple Space; 1995 ACM, pp. 89-96.

J. Briot et al., Concurrency and Distribution in Object Oriented Programming; ACM Computing Surveys, vol. 30, No. 3, Sep. 1998, pp. 291-329.

Z. Abdelouahab et al., Concurrency in Object Oriented Language Actel; 1997 IEEE, pp. 291-296.

R. Choudra et al., COOL: An Object-Based Language for Parallel Programming; 1994 IEEE, pp. 13-26.

B.L. Massingill, Experiments with Program Parallelization Using Archetypes and Stepwise Refinement; Parallel Processing Letters, vol. 9, No. 4, 1999, pp. 487-498.

N. Sundaresan, Extending the Standard Temple Library for Parallelism in Coir<Futures>; Third USENIX Conference on Object-Oriented Technologies (COOTS), 1997, pp. 159-174.

N. Uchihira et al., Hypersequential Prgramming; 1997 IEEE, pp. 44-54.

M. Karaorman, et al., Introducing Concurrency to a Sequential Language, Communications of the ACM, Sep. 1993, vol. 36, No. 9, pp. 103-116.

The MPI Forum, MPI: A Message Passing Interface; 1993 ACM, pp. 878-883.

MPI: A Message-Passing Interface Standard; 1994.

C. Chu et al., Parallelizing Subroutines in Sequential Programs; 1994, IEEE Software, pp. 77-85.

H.E. Bal et al., Programming Languages for Distributed Computing Systems; ACM Computing Surveys, vol. 21, No. 3, Sep. 1989, pp. 262-322.

C.T.H. Everaars, et al., Restructuring Sequential Fortran Code into a Parallel/Distributed Application; 1996 IEEE, pp. 13-22.

C.T.H. Everaars, et al., Using Coordination to Restructure Sequential Source Code into Concurrent Program; ICSM 2001: 342-351.

* cited by examiner

METHOD FOR EXECUTING A SEQUENTIAL PROGRAM IN PARALLEL WITH AUTOMATIC FAULT TOLERANCE

FIELD OF THE INVENTION

The present invention relates to the field of parallel and distributed computing and to the field of object oriented software design. More specifically, it relates to a method and system for executing a sequential program in parallel with automatic fault tolerance.

BACKGROUND OF THE INVENTION

Parallel computing is the use of two or more processors (computers) in combination to solve a single problem. Parallel computing involves writing concurrent programs. In writing a concurrent program, the programmer has to figure out how to break the problem into pieces, and has to figure out how the pieces relate to each other.

There are different ways of running a concurrent program on an execution platform. The program may be executed on a uni-processor machine, for example, using a threading system, or on a parallel computer comprising plurality of processors. While concurrency is a semantic property of a program, parallelism pertains to its implementation as determined by the compiler, libraries and other systems software.

Distributed computing is a specialized form of parallel computing in which the processing nodes (computers) are physically distributed and are interconnected. These interconnections may or may not be reliable. However, the computers must cooperate in order to maintain some shared state to work on the given problem. Distributed Computing harnesses the idle processing cycles of the workstations on the network and thus makes them available for working on computationally intensive problems that would otherwise require a supercomputer or workstation/server cluster to solve.

The development of parallel programs is a tedious task and involves numerous skills other than the general programming skills on the part of the programmer. The development involves division of the problem into parallel executable fragments and synchronizing the parallel executing processes with each other in order to produce a proper result. The programmer must also handle transfer of data from one process to another. Furthermore, distributed systems used to run the parallel programs are unreliable and prone to system shutdowns and network failures. In order to make a system fault tolerant, a programmer has to encode the necessary complex instructions in the system to recover from a failure, which takes a lot of extra effort.

Debugging of a concurrent program is even more tedious than building it. In a method of debugging a concurrent program concurrent program is serialized and the programmer is provided with the tools to debug it as a sequential program [U.S. Pat. No. 5,860,009, Naoshi Uchihira, Shinichi Honiden, Toshibumi Seki, "Hypersequential Programming: A New Way to Develop Concurrent Programs"]. After debugging of the program, its concurrency is restored back and is executed as parallel processes.

There are many approaches for achieving parallelism. In one approach called as data parallelism, in order to add parallelism to a programming language, the language is extended, that is, the compiler is extended to recognize the new language constructs. While such newer extended languages provide enhanced performance they are limited by a lack of portability between operating systems. Moreover, the programmer needs to learn the new language constructs. Parallel compilers are usually based on data parallel programming model. High Performance FORTRAN (HPF) and Data Parallel C Extensions (DPCE) support data programming. In this model, distribution of data at a very high level is specified using parallel variables. This approach is also limited by the type of tasks that can be parallelized and cannot be used for general purpose parallel computation.

The other approach to design and implement a parallel program, rather than using a new extended compiler, is to use Message Passing Libraries (MPL). In this model, processes communicate by sending and receiving messages. Data transfer requires cooperative operations to be performed by each process (a send operation must have a matching receive). Programming with message passing is done by linking with and making calls to libraries which manage the data exchange between processors. MPI (Message Passing Interface) and PVM (Parallel Virtual Machine) are standard message passing libraries providing concurrency among processes [Message Passing Interface Forum, "MPI: A message-passing interface standard"]. In these libraries, it is the programmer's responsibility to resolve data dependencies and avoid deadlocks and race conditions.

In other approach, called control parallelism or task parallelism or functional parallelism, work is divided into multiple threads. In this model different tasks are executed at the same time. It requires all subroutines to be thread-safe. OpenMP is based on this model [Leonardo Dagum, Ramesh Menon, "OpenMP: An Industry-Standard API for Shared-Memory Programming"]. OpenMP uses the fork-join approach of parallel execution with threads. Routines for locking the data are to be used by the programmer for handling synchronization. OpenMP FORTRAN implementations are not required to check for dependencies, conflicts, deadlocks, race conditions or other problems that result from incorrect program execution. TOPC (Task Oriented Parallel C\C++) is a software library built on master slave model [G. Cooperman, "TOP-C: a task-oriented parallel C interface"].

It is now well accepted that the object paradigm provides good foundations for the new challenges in concurrent and distributed computing. Object notions, rooted in the data-abstraction principle and the message-passing metaphor, are strong enough to structure and encapsulate modules of computation and flexible enough to match various granularities of software and hardware architectures. Programs structured around objects are modular, and easier to understand and modify. However, in addition to these advantages, integrating concurrency and synchronization with data abstraction offers benefits that are particular to parallel programming. As a result, many object-based concurrent, parallel, or distributed models, languages, or system architectures have been proposed like Abcl, Actel, Actor, Argus, Concurrent Smalltalk, COOL, Eiffel, Emerald, Hybrid, Nexus, Parmars, POOL-T, Presto [Jean-Pierre Briot, Rachid Guerraoui, Klaus-Peter Lohr, "Concurrency and distribution in object-oriented programming"].

Several object oriented implementations for supporting basic concurrency exist. Various encapsulations for providing an object oriented interface over the basic operating system services for process management have evolved. Synchronization has been simplified through the use of synchronized procedures associated with each object. Library provided as part of software development kit of JAVA is a perfect example. Some modern implementations have made introducing concurrency in the program much easier through active object. Active objects provide a view of object as a process. Concurrency in active objects can then be viewed as the parallel execution resulting from the creation of these active objects and their interactions with one another. Calls to active objects act like message exchange between two processes. Similar to the active objects are actor-based languages. Actors are self-executing objects, each having a unique address and a mailbox. Actors communicate by sending messages asynchronously and executing concurrently.

All the above methods of achieving concurrency involve organization of the program along interacting parallel executing processes. They involve division of either data or tasks into parallel executing fragments. Processes-have to communicate and are required to be synchronized with each other in order to get right results.

Work has also been done in the direction of conversion a sequential program to parallel executable code [U.S. Pat. Nos. 5,088,034 and 5,452,461, W. Blume, R. Doallo, R. Eigenmann, J. Grout, J. Hoeflinger, T. Lawrence, J. Lee, D. Padua, Y. Paek, B. Pottenger, L. Rauchwerger, and Peng Tu, "Parallel Programming with Polaris", M. W. Hall, J. M. Anderson, S. P. Amarasinghe, B. R. Murphy, S. W. Liao, E. Bugnion, and M. S. Lam, "Maximizing multiprocessor performance with the SUIF compiler", C. Polychronopoulos, M. Girkar, M. R. Haghighat, C.-L. Lee, B. Leung, and D. Schouten, "Parafrase-2: a new generation parallelizing compiler" and P. Banerjee, J. A. Chandy, M. Gupta, E. W. Hodges IV, J. G. Holm, A. Lain, D. J. Palermo, S. Ramaswamy, and E. Su., "The PARADIGM Compiler for Distributed-Memory Multicomputers"]. A compiler is extended to find data dependencies between parts of the program and independent parts are made to execute in parallel. Other methods of parallelization include 'Interprocedural analyses and ' Symbolic analyses. A suitable parallel code is built and put in place of the sequential code. However, these compilers are faced with an inherent limitation in their capability to find parallel part in a program containing operation directly on memory addresses. Dependence or non-dependence between any two parts is sometimes known only at runtime or depends on program input; these compilers, which rely on prior division of the program, cannot resolve them. Most of these implementations are long way to come into actual practical use. Some other implementations require the programmer to select and link components in a dataflow graph to specify dependency between them [U.S. Pat. No. 5,999,729], while some others resolve the dependency by having questions and answers between a system and the user [U.S. Pat. No. 6,253,371]. Another method to bring parallelism to a sequential program is by allocating instructions to the processors depending on the memory address contained in the operand [U.S. Pat. No. 5,619,680]. However, the parallelism achieved is instruction level and its scalability is highly limited.

In one method of execution of sequential program in parallel is to serially label the steps to access or modify data variables in accordance with the intended sequence of the whole sequential program and then executing parts in parallel under a control system such that all memory accessing and modifying operations are executed only in the sequential order [U.S. Pat. No. 5,832,272]. The system however got huge overheads and requires special hardware is not applicable on programs with complex memory accesses.

In some object oriented systems, future objects are used for parallelization of a sequential program [U.S. Pat. No. 5,404,521, Neelakantan Sundaresan, "Extending the Standard Template Library for Parallelism in Coir<Futures>", Rohit Chandra, Anoop Gupta, John L. Hennessy, "COOL: An Object-Based Language for Parallel Programming"]. In such systems, computation intensive subroutines are called asynchronously. Asynchronous call means that the called procedure executes in parallel with rest of the program. The result of the subroutine is made to be stored in a 'future' object after it returns. The main program continues to run with the subroutine concurrently. If the main program accesses the future object before subroutine returns, the program simply blocks to await the desired result. The mechanism does not allow access to future object holding return value of a remote procedure in the main program or passing it as an argument to another procedure. Thus by using futures, parts of a sequential program are executed in parallel, with implicit synchronization. The programmer does not handle the synchronization in the future object; it is inbuilt. Communication is also implicit in form of arguments (from main program to subroutine) and futures (from subroutine to main program).

However, many limitations remain in the usage of future objects and to the level of parallelism achievable through them.

Futures can only be used for return value. But in normal practice, arguments are also used for returning data values. Synchronization of theses values is not handled by the futures. This limits the procedures that can be executed in parallel.

Future object, if not available, blocks the main process when passed as an argument to a subroutine. This limits the level of parallelism achievable (futures are used in the subroutine, not at point of calling the subroutine). An object oriented language, Actel, does provide for passing futures as arguments to other procedures [Zair Abdelouahab and Slimane Hammoudi, "Concurrency in Object Oriented Language Actel"], but it has got its own limitations; it is confined to shared memory architectures only.

Futures do not support partial returning; a value can become available from a parallel subroutine only after all the return values have been evaluated, reducing the level of parallelism achieved.

Also, futures are incompatible with references, especially on a distributed memory system. References play an important role in any programming language system. Nonconformity of any architecture to references severely limits its capability to be used in various complex systems. In distributed systems, support for references involves the complex task of not only the synchronization over referred data, but also of maintaining the linkage structure (how data are connected), which is subject to changes during program execution, together with providing parallelism.

In all, use of futures does not bring true parallelism to a sequential program. Futures can be used to execute in parallel simple procedures only, which take only [in] arguments ([inout] not supported, i.e. C++ pointer or reference arguments are unsupported) and in which arguments themselves do not contain references.

Another popular mechanism for distributed computing is through RPC. The semantics of RPC are identical to the semantics of the traditional procedure call, except that while a normal procedure call takes place between procedures of a single process in the same memory space, RPC takes place between a client and a server process on different systems connected through a network. Like a normal procedure call, RPC is a synchronous operation, i.e., the client process is blocked until processing by the server is complete. To gain parallelism RPC has been extended to asynchronous calls also. Futures can be employed for synchronization in a limited manner [U.S. Pat. No. 5,999,987, Murat Karaorman, John Bruno, "Introducing concurrency to a sequential language"].

OBJECTS AND SUMMARY OF THE INVENTION

The object of this invention is to obviate the above mentioned drawbacks and provide a method and system for executing a sequential program in parallel with automatic fault tolerance.

The second object of the invention is to simplify the development of parallel and distributed programs that can be run on various platforms. The platform can be a multi processor computer, a high speed cluster dedicated to parallel computing, a network of computers, where people do their day to day work, or even the Internet.

Yet another object of the invention is to enable users to exploit their existing computer hardware to solve much larger problems at minimal additional cost. It is easy to observe that any computer on a network is not fully utilized at all times except during short processing bursts that require more resources for execution. The invention allows idle processing cycles of such computers to be used to execute a large application distributed over the network.

These and above objects are achieved by providing a system and method to allow a programmer to write a sequential program containing parallel procedures without any extra effort required to write a parallel program using traditional programming platforms. The programmer can specify procedures in a sequential to be executed in parallel using special language constructs, and the system automatically executes them in parallel with the rest of the program. The system does so by dividing the program into jobs that can be executed in parallel to each other. Data types of the arguments to the parallel procedure are changed to synchronous objects that are special wrapper classes around the regular data types provided by the language platform. The system implicitly takes care of inter-process communication and synchronization over the argument values required between various executing threads and processes of the program and therefore the programmer also does not require taking care of any deadlock in the program. For the purpose of debugging, the system has an implicit feature that program can be debugged in sequential mode.

The system supports references in the argument variables. It provides synchronization over the referred data also. The system also supports alterations in the linkage structure of the data (how data are connected with each other through references) and maintains the synchronization together with linkage structure modifications.

The system resolves the dependencies (including those generated on account of references) at run-time and parallelization is done to the level where actual dependency is encountered. Therefore the system is much more efficient in parallelizing programs.

The system may be built by extending the compiler, making the task of specifying the parallel procedures and its arguments simpler. However, the system is easily practicable on a language system without any compiler extensions through the library mechanism and therefore can be easily ported to any platform.

The invention utilizes the untapped computing power of the nodes connected to the network by transferring the execution of the jobs to these nodes. Various threads and processes of the program can be executed on any or all the nodes connected to the network. The system can automatically detect resources (including new processing nodes) on the network and add them to its resource pool as and when any new resource is added to the network. The system can automatically select any node on the network having sufficient free resources to execute the job or the programmer can use special language constructs to specify a particular node for job execution. The program can be assigned a low priority so that it runs unobtrusively in the background not affecting other tasks being carried out on the host machine.

In addition, the invention provides automatic fault tolerance, i.e., no extra effort is required on the part of the programmer to write any code to recover from any fault that may occur on the network; the system does that automatically. The fault may be a process failure, a processing node failure or communication link fault. If a node fails during execution of a program all the jobs given to it are transferred to some other machine unobtrusively. Thus, a program can be executed on network are used for other activities, where computers go on and off regularly.

BRIEF DESCRIPTION OF THE ACCOMPANYING DRAWINGS

The invention will now be described with reference to the following figures.

Figure 15:
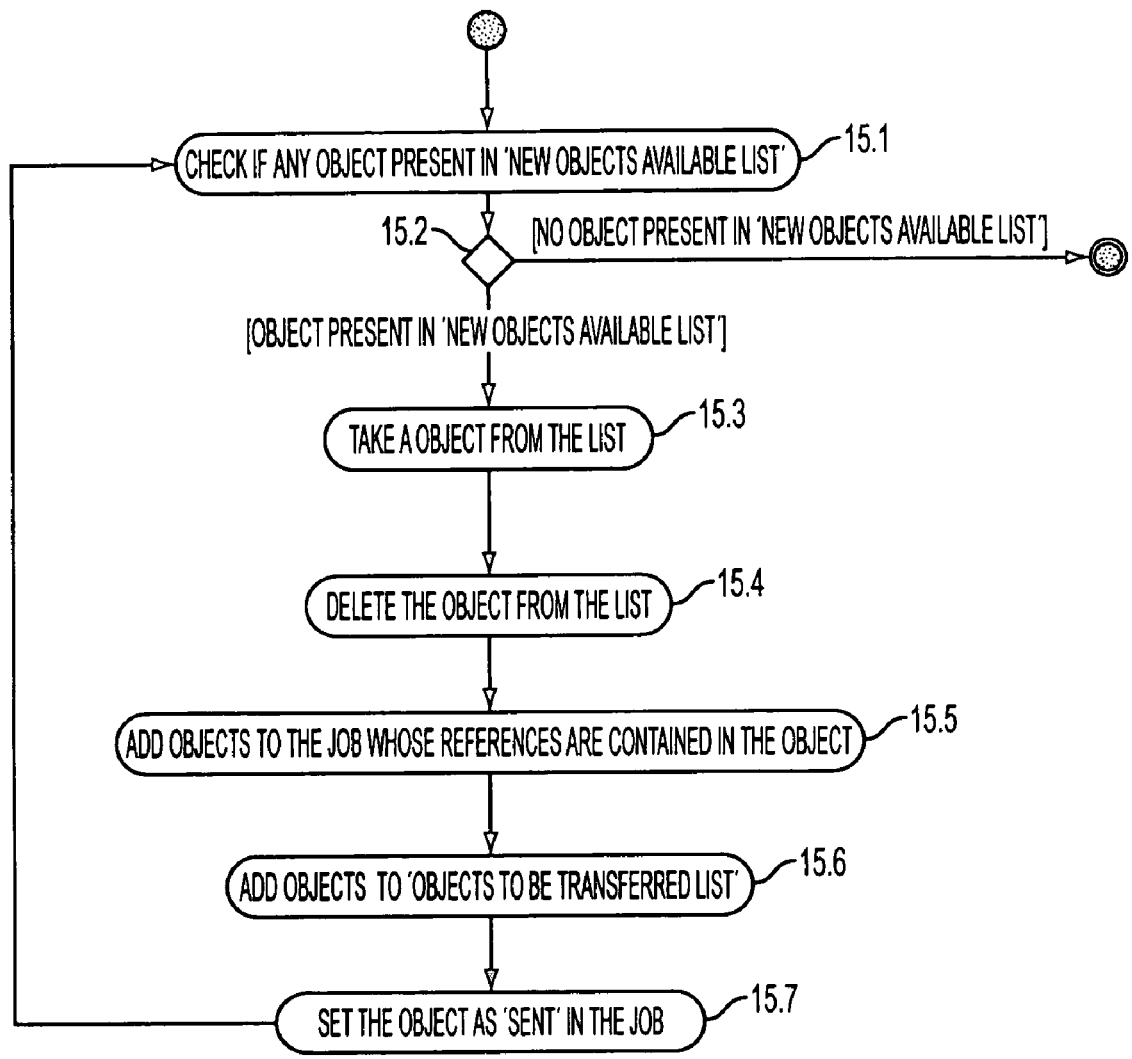

FIG. 15 demonstrates the process of update of the job.

Figure 16:
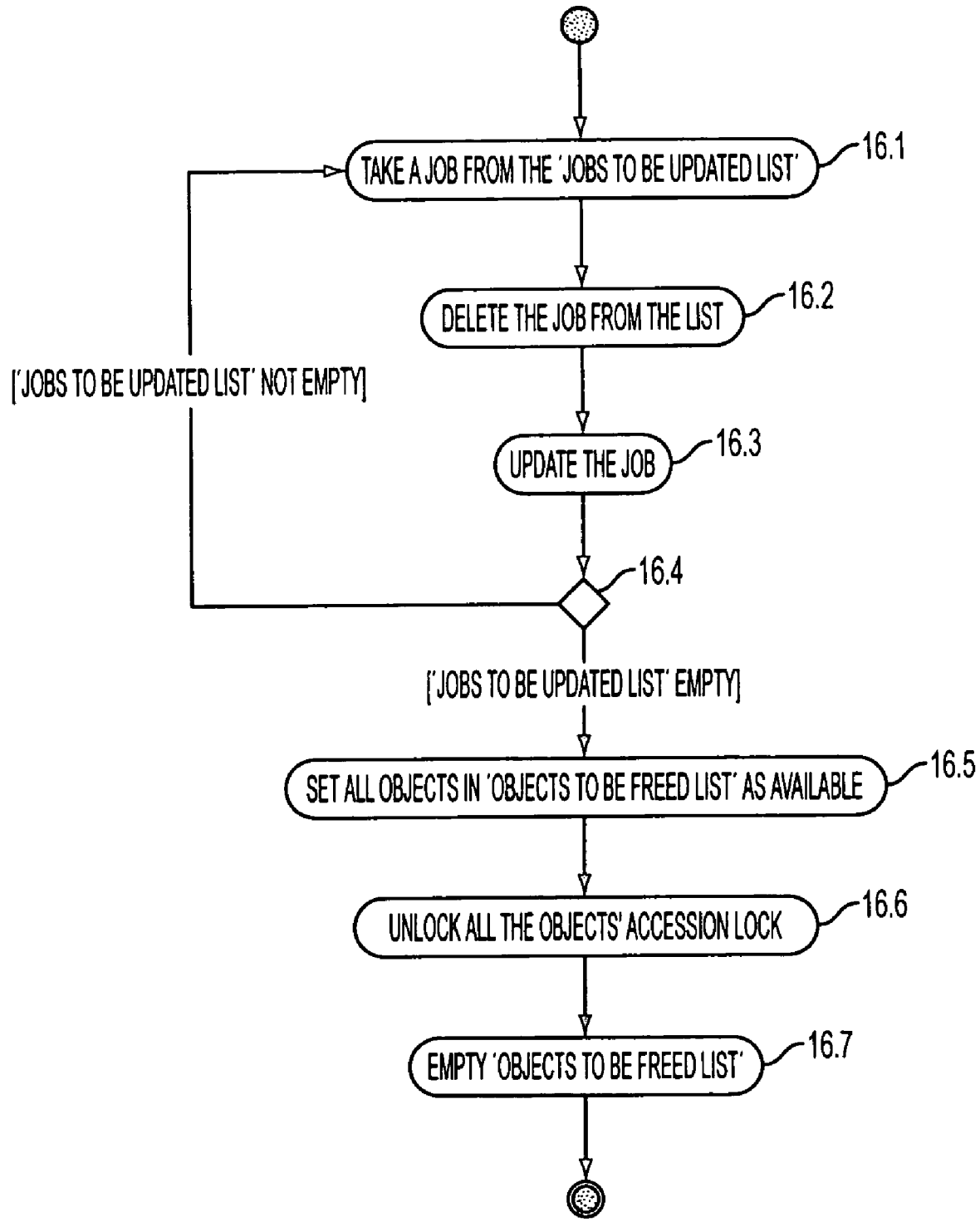

FIG. 16 is the activity diagram of updating all the jobs in 'jobs to be updated list'.

Figure 17:
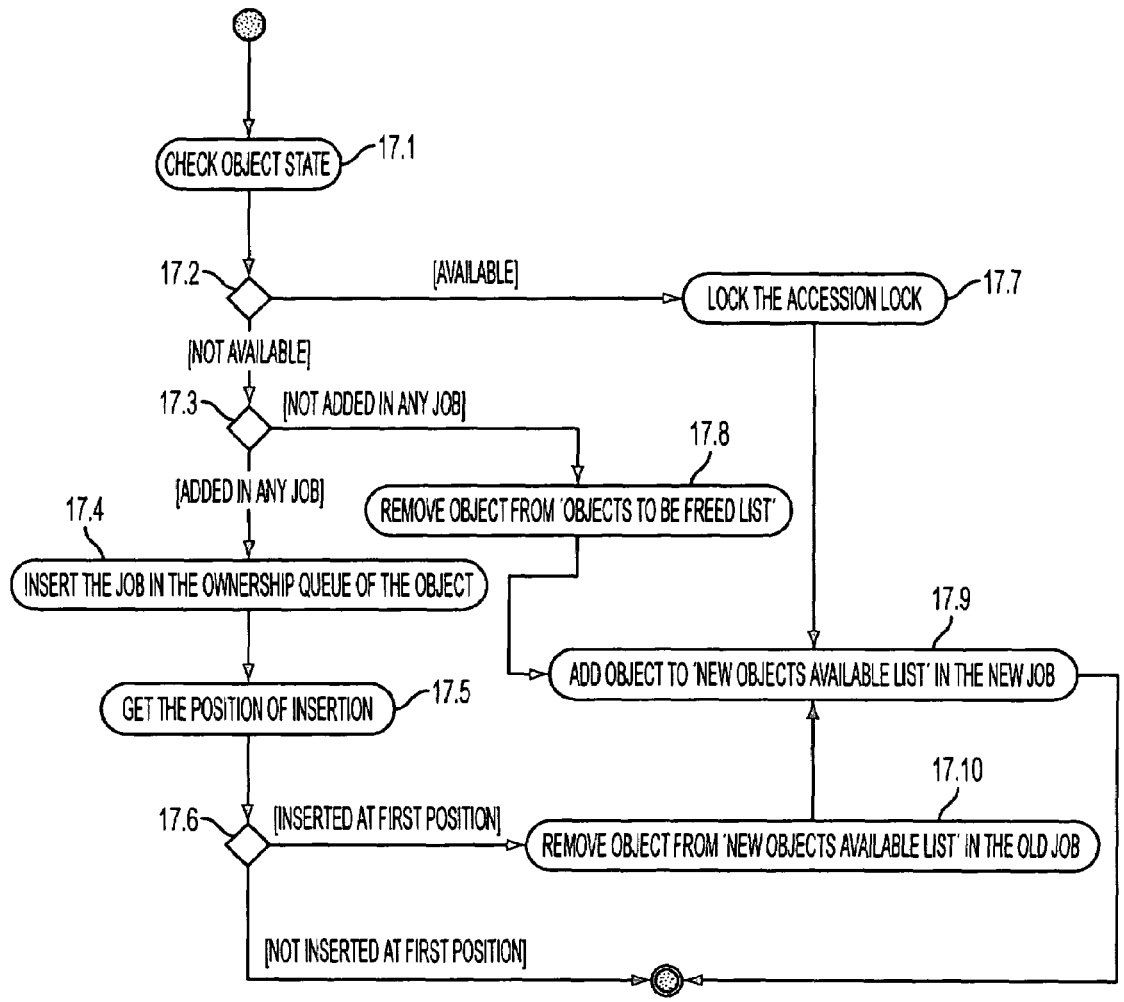

FIG. 17 is the activity diagram of the addition of the job in the ownership queue of a synchronous object.

Figure 18:
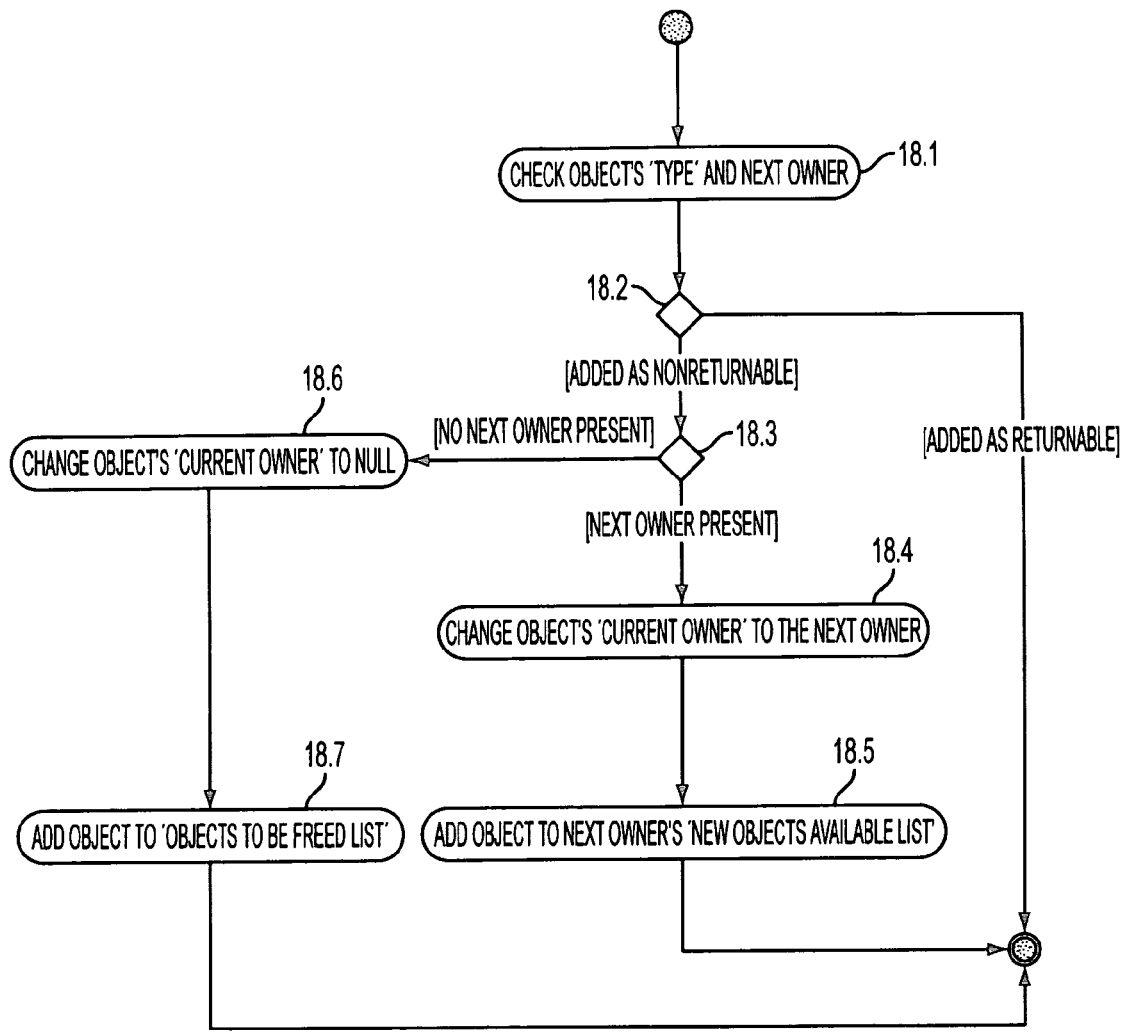

FIG. 18 is the activity diagram depicting the operations done on the object's ownership in the master process after the object's ownership is transferred to the job and its value is sent.

Figure 19:
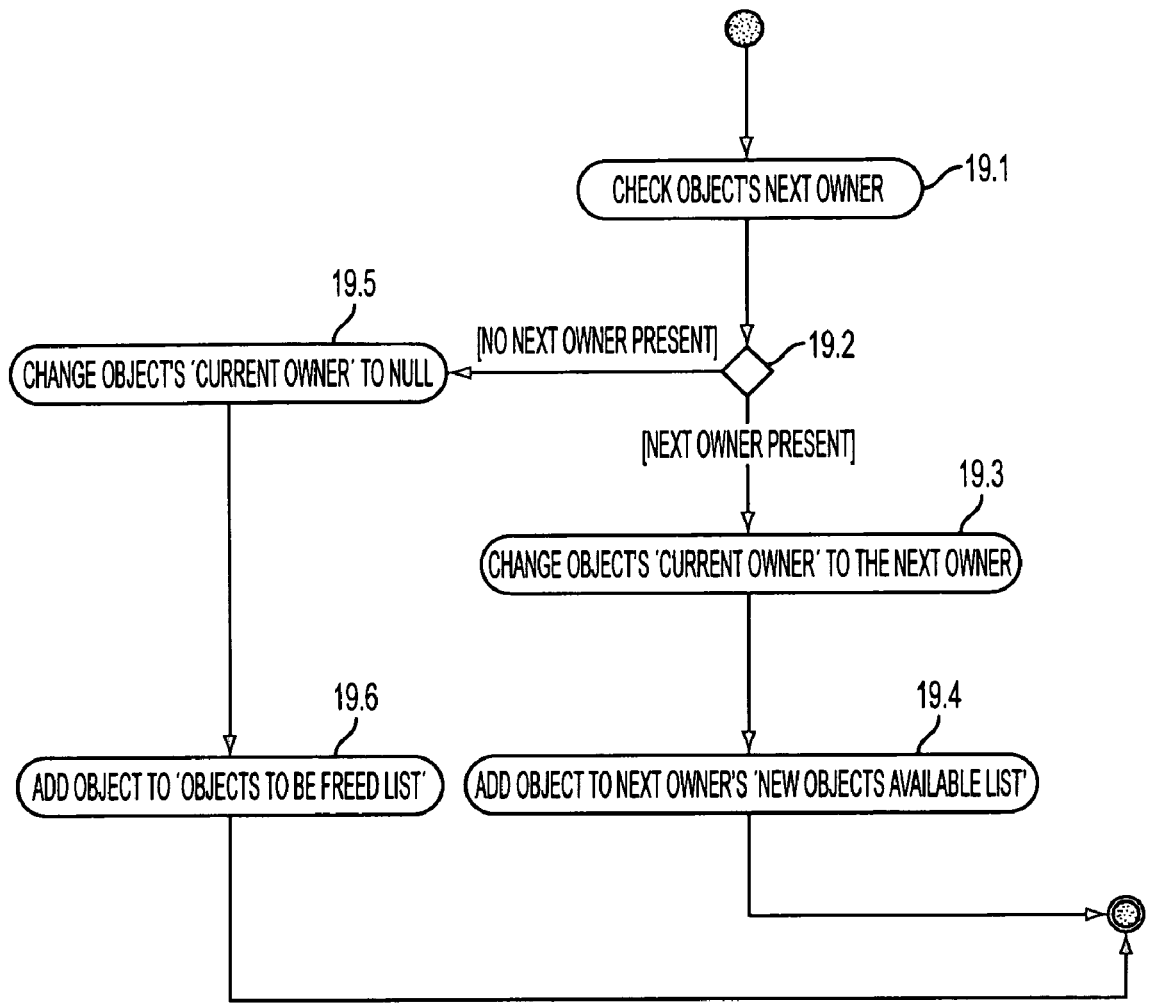

FIG. 19 is the activity diagram depicting the operations done on the object's ownership in the master process after the object's value is updated and ownership is released by the job.

Figure 20:
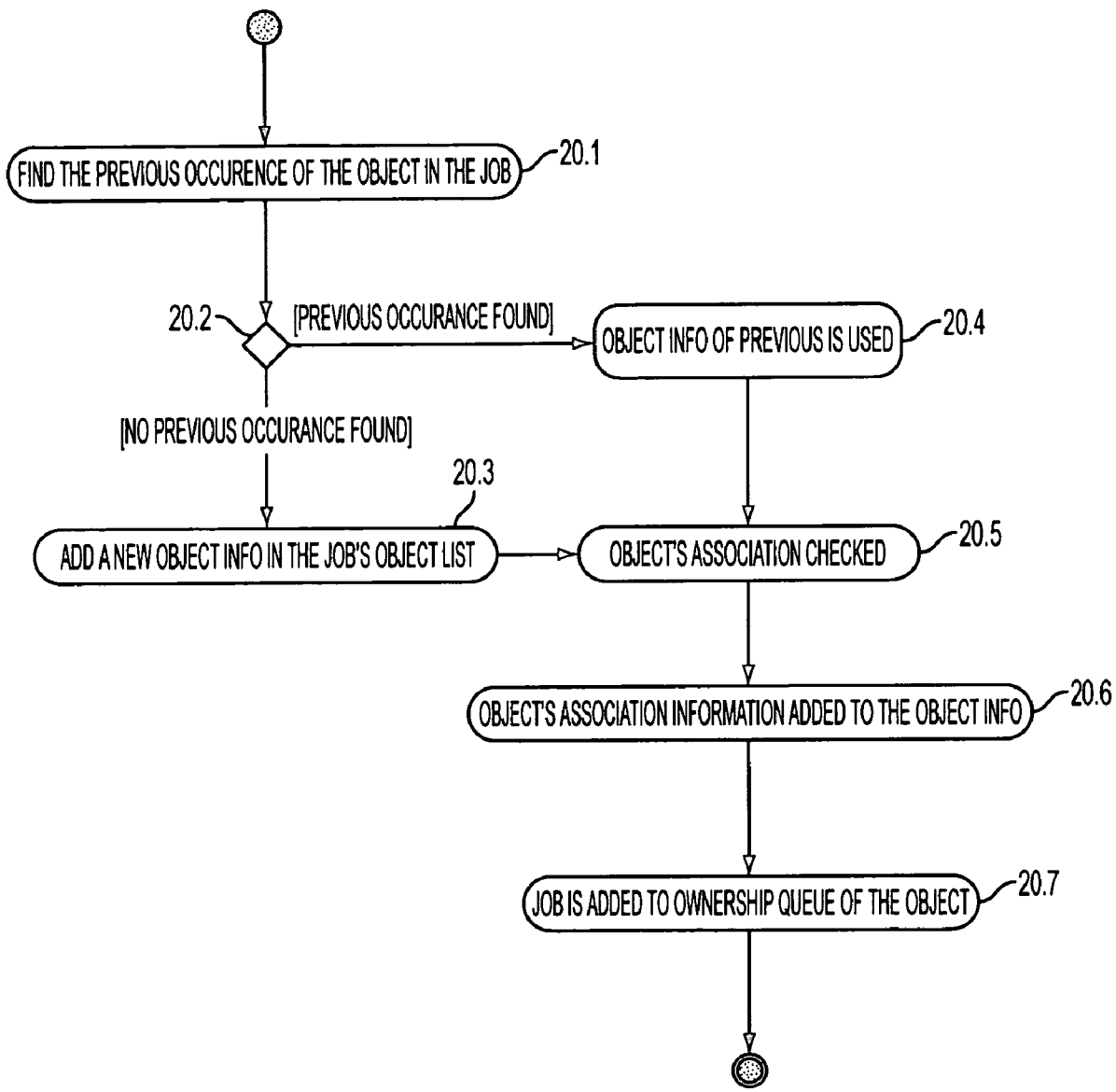

FIG. 20 is the activity diagram of the addition of the synchronous objects to the job.

Figure 21:
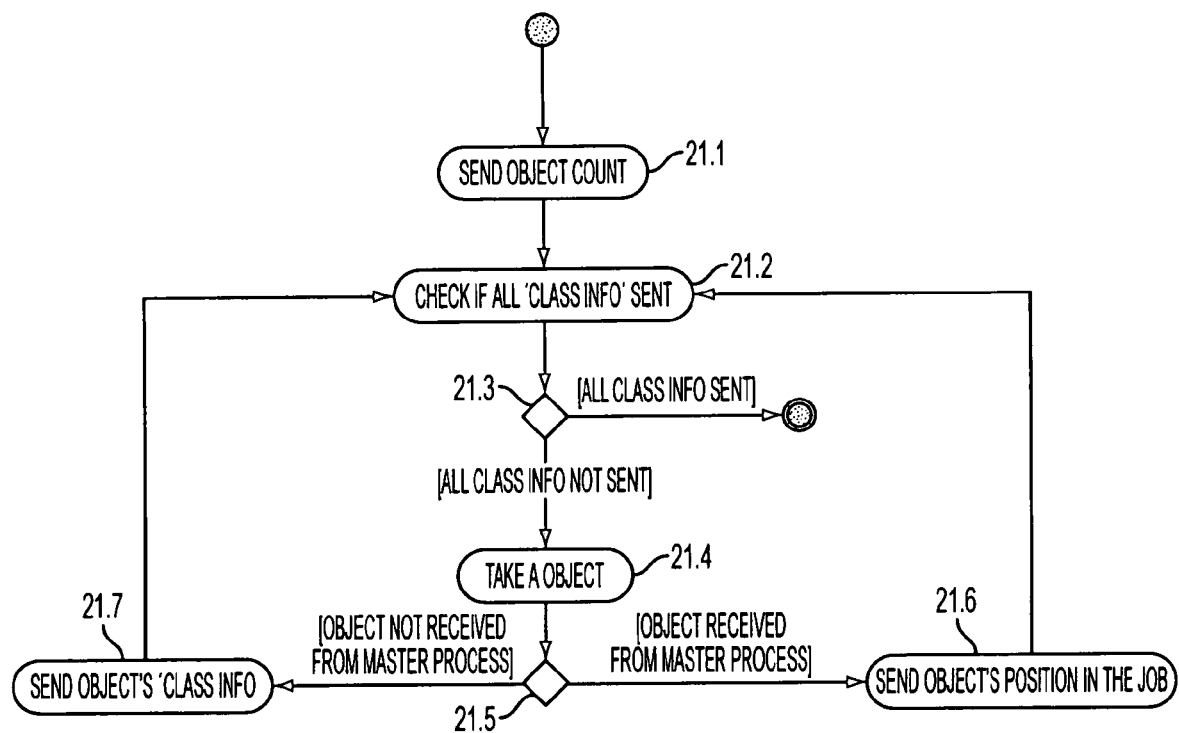

FIG. 21 is the activity diagram of sending the object list update from the slave process.

Figure 22:
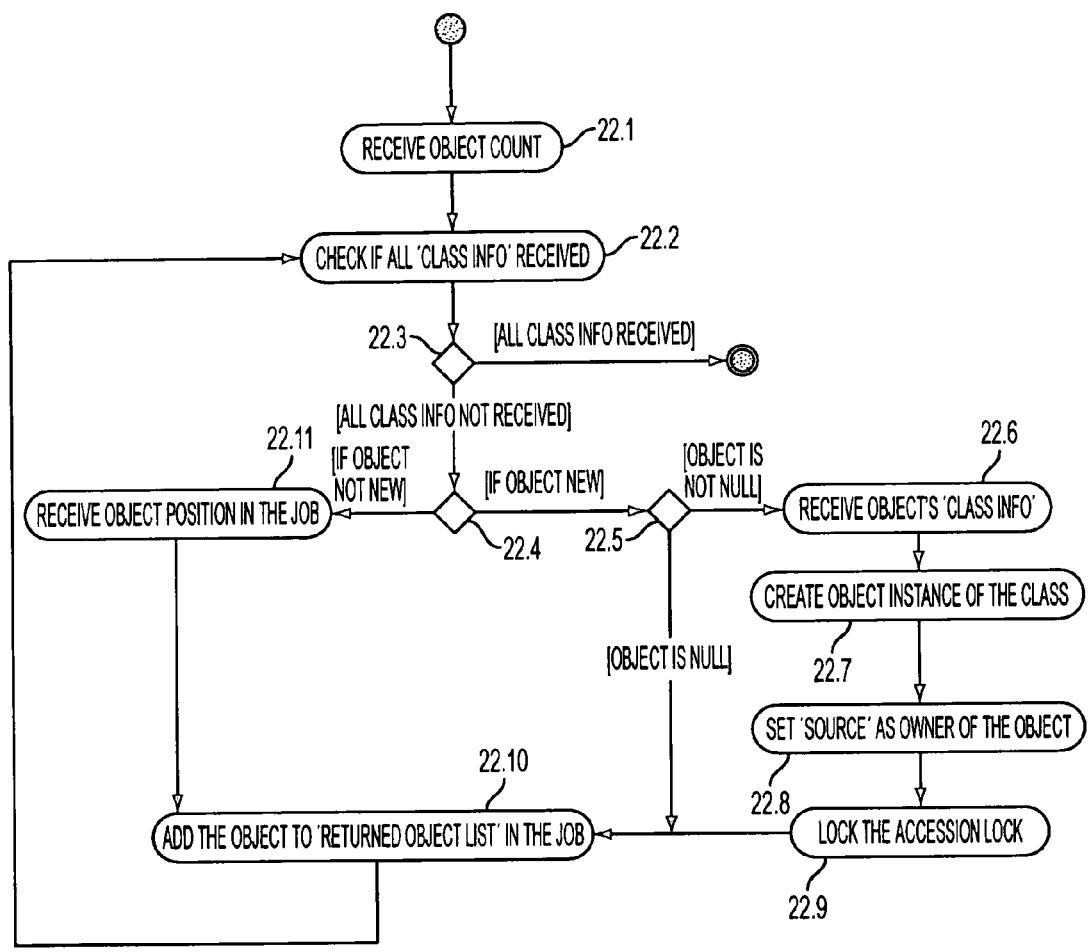

FIG. 22 is the activity diagram of receiving the object list update in the master process.

Figure 23:
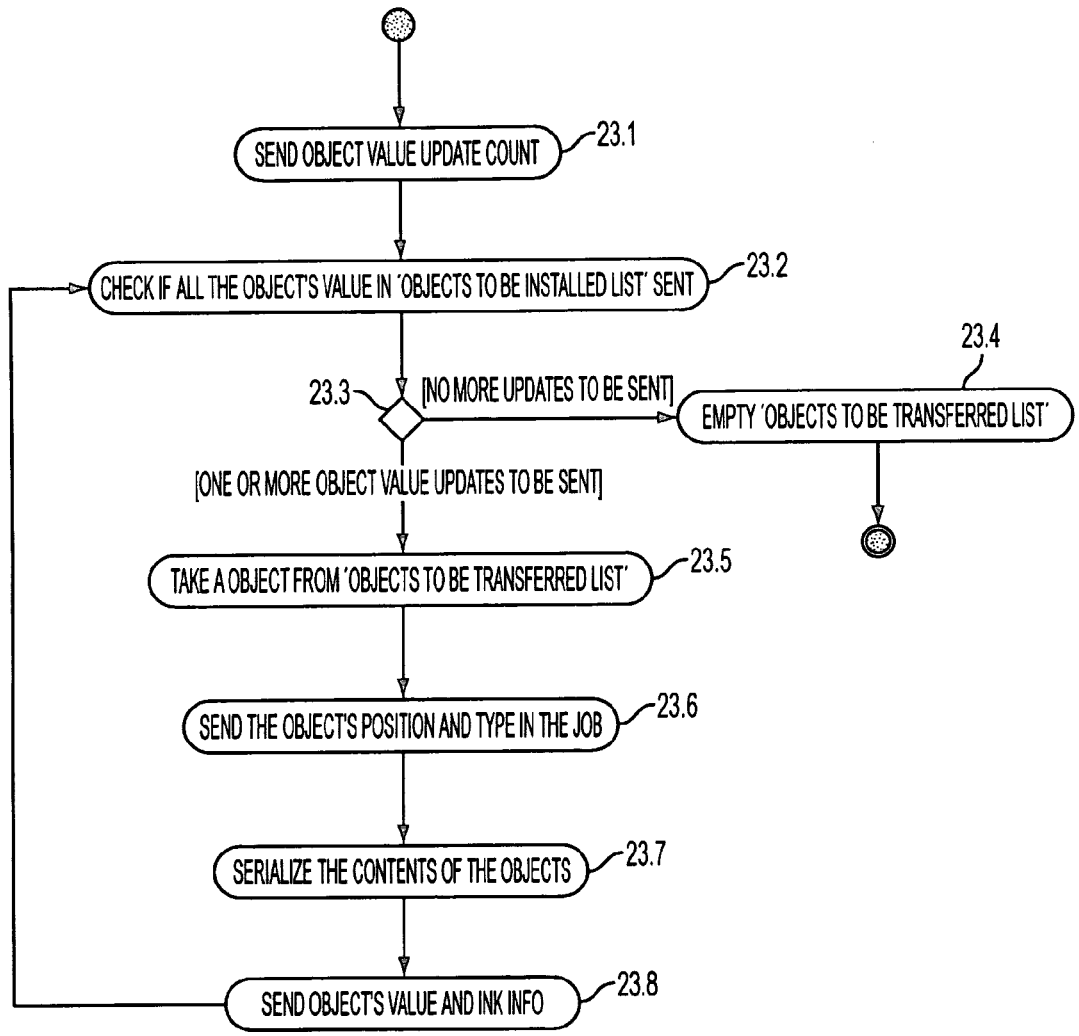

FIG. 23 is the activity diagram of sending object value updates from the master process.

Figure 24:
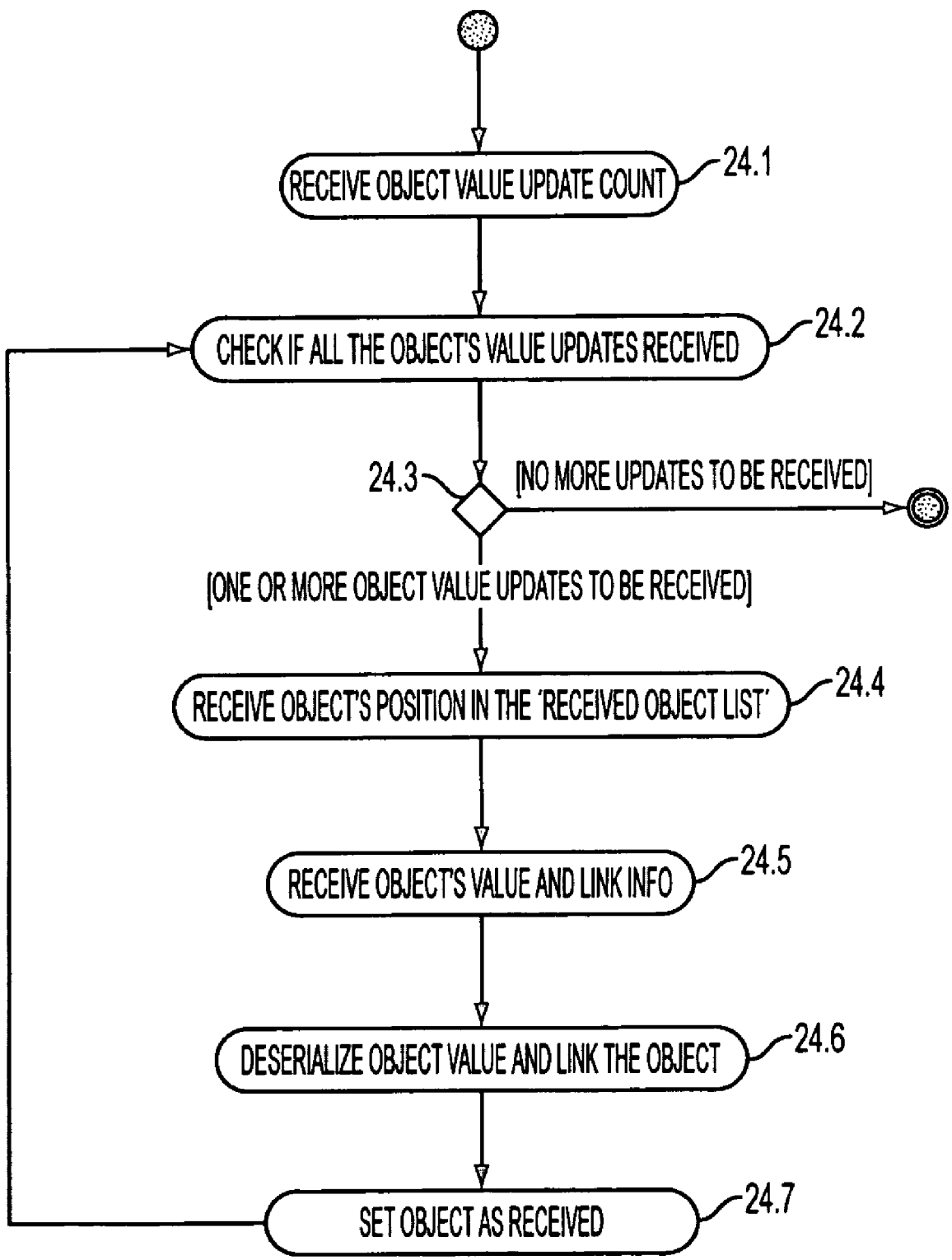

FIG. 24 is the activity diagram of receiving the object value updates in the slave process.

Figure 25:
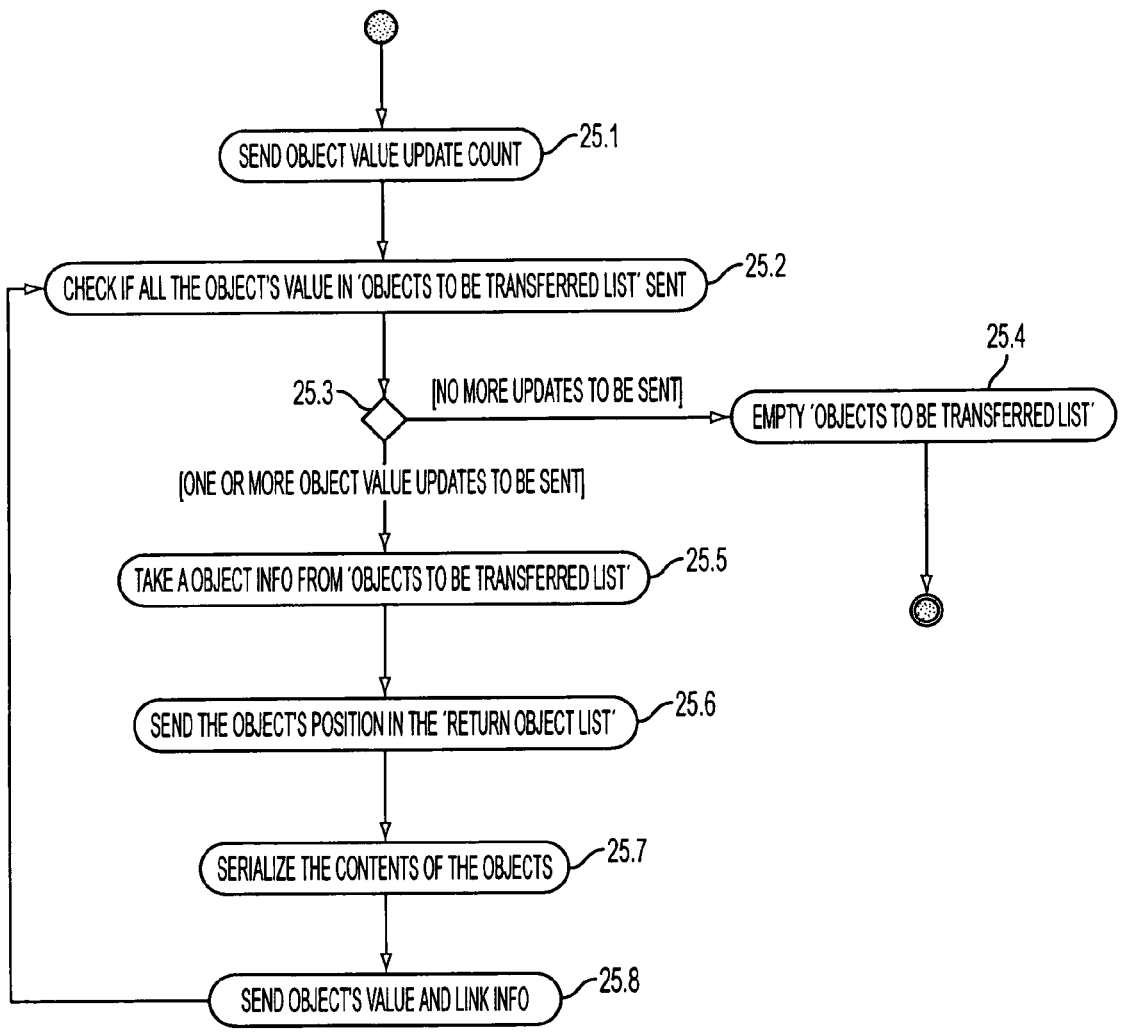

FIG. 25 is the activity diagram of sending object value updates from the slave process.

Figure 26:
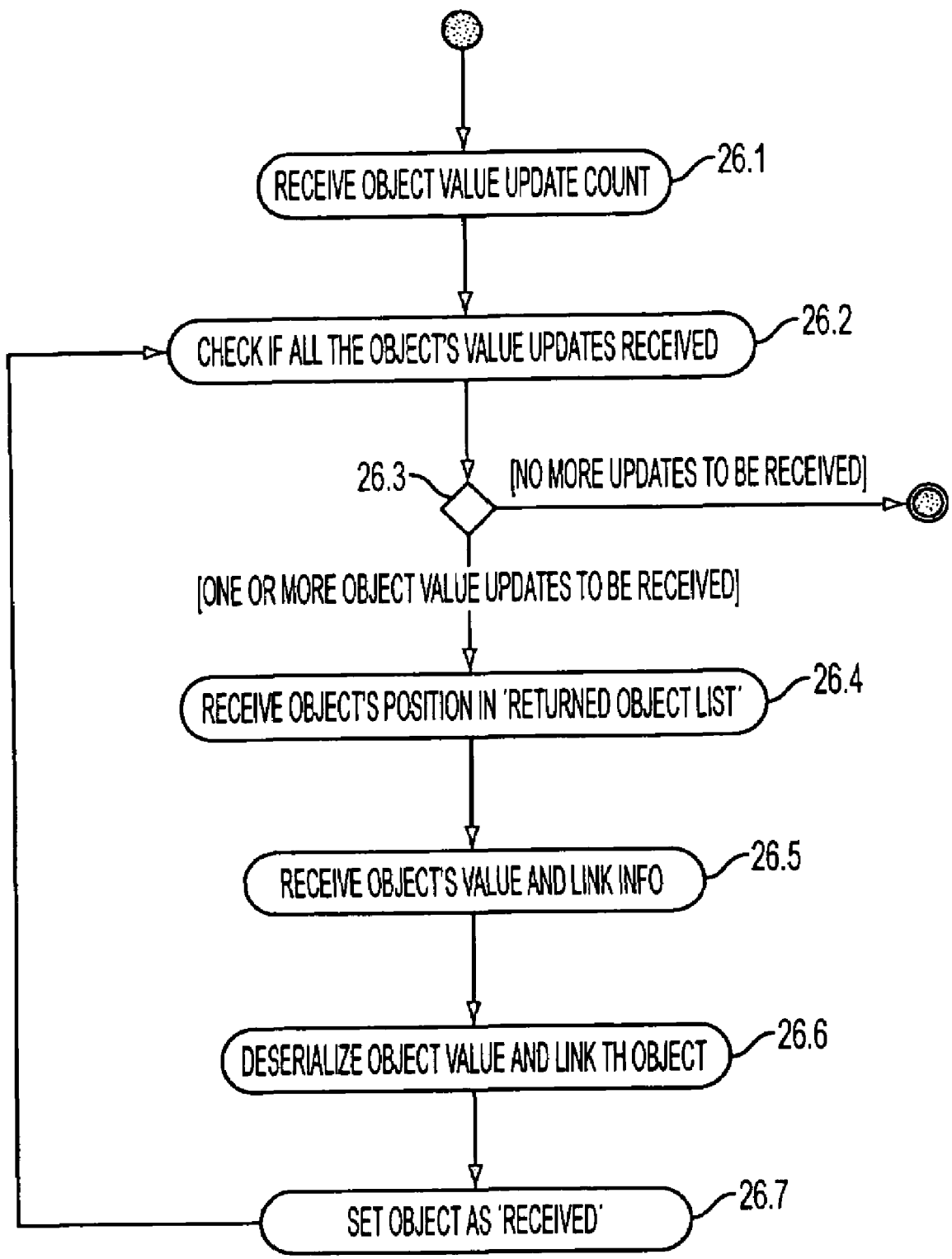

FIG. 26 is the activity diagram of receiving the object value updates in the master process.

Figure 27:
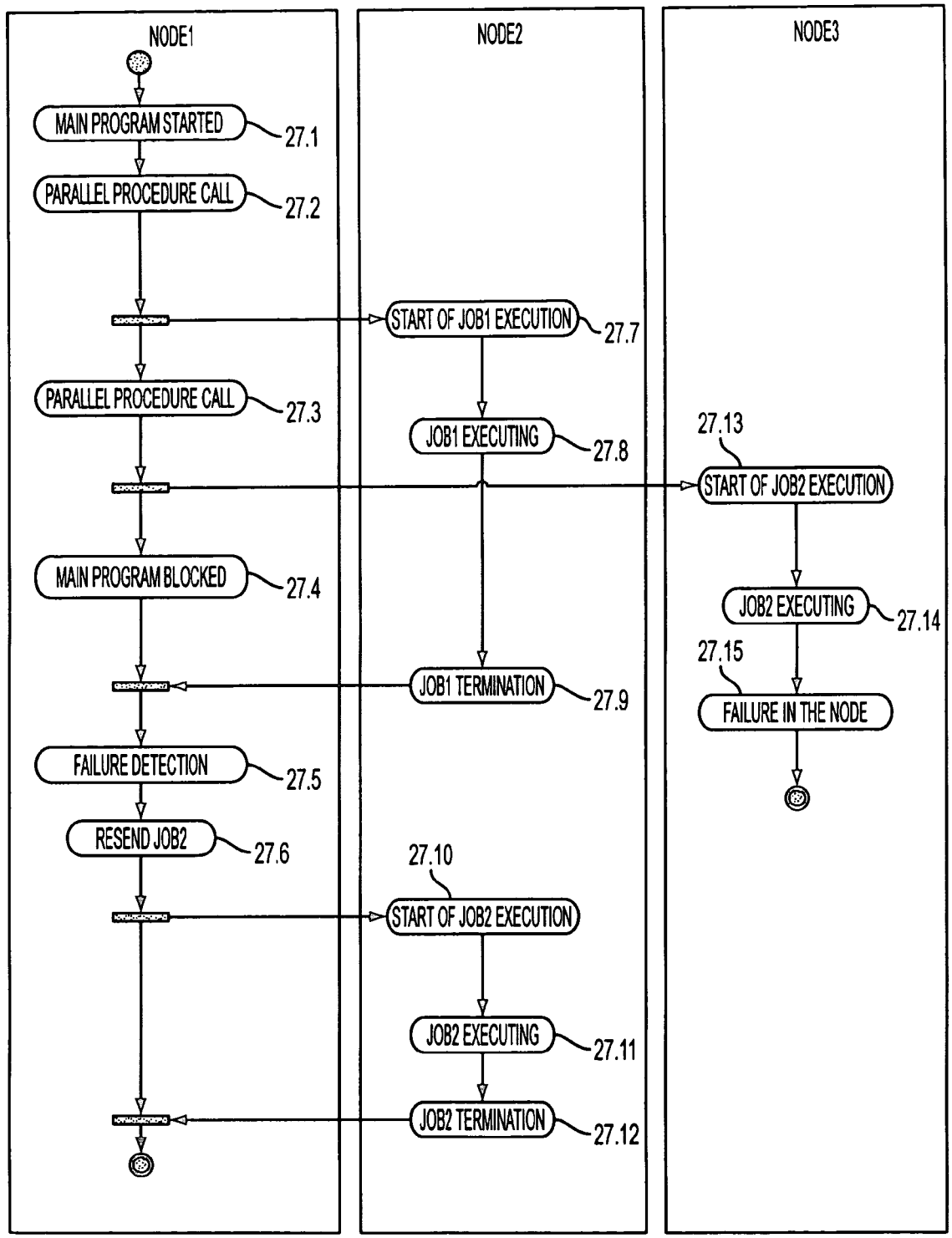

FIG. 27 is the activity diagram showing fault recovery by rescheduling the job that was assigned to a processing node that failed.

Figure 28:
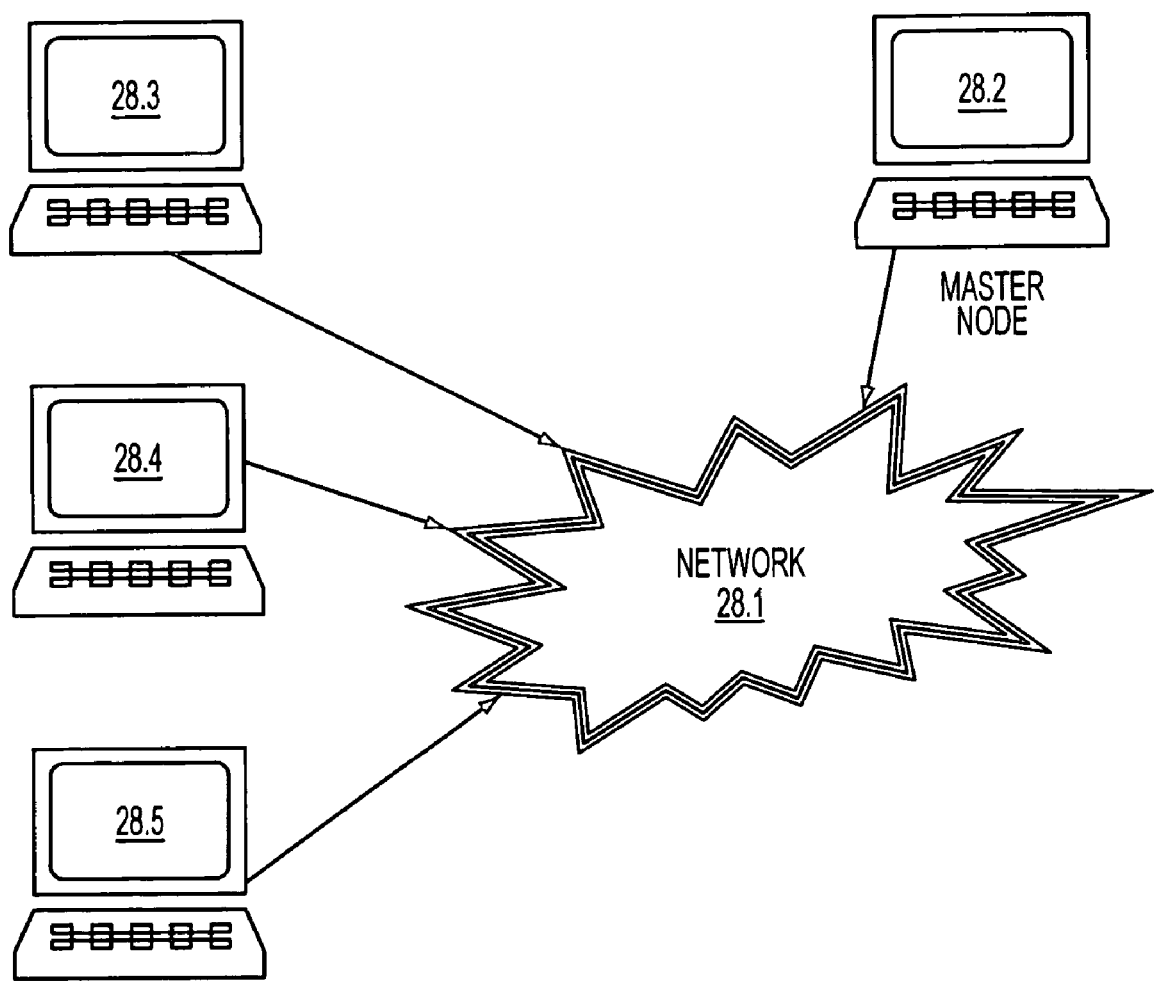

FIG. 28 is a pictorial representation of a network of data processing systems in which the present invention may be implemented.

Figure 29:
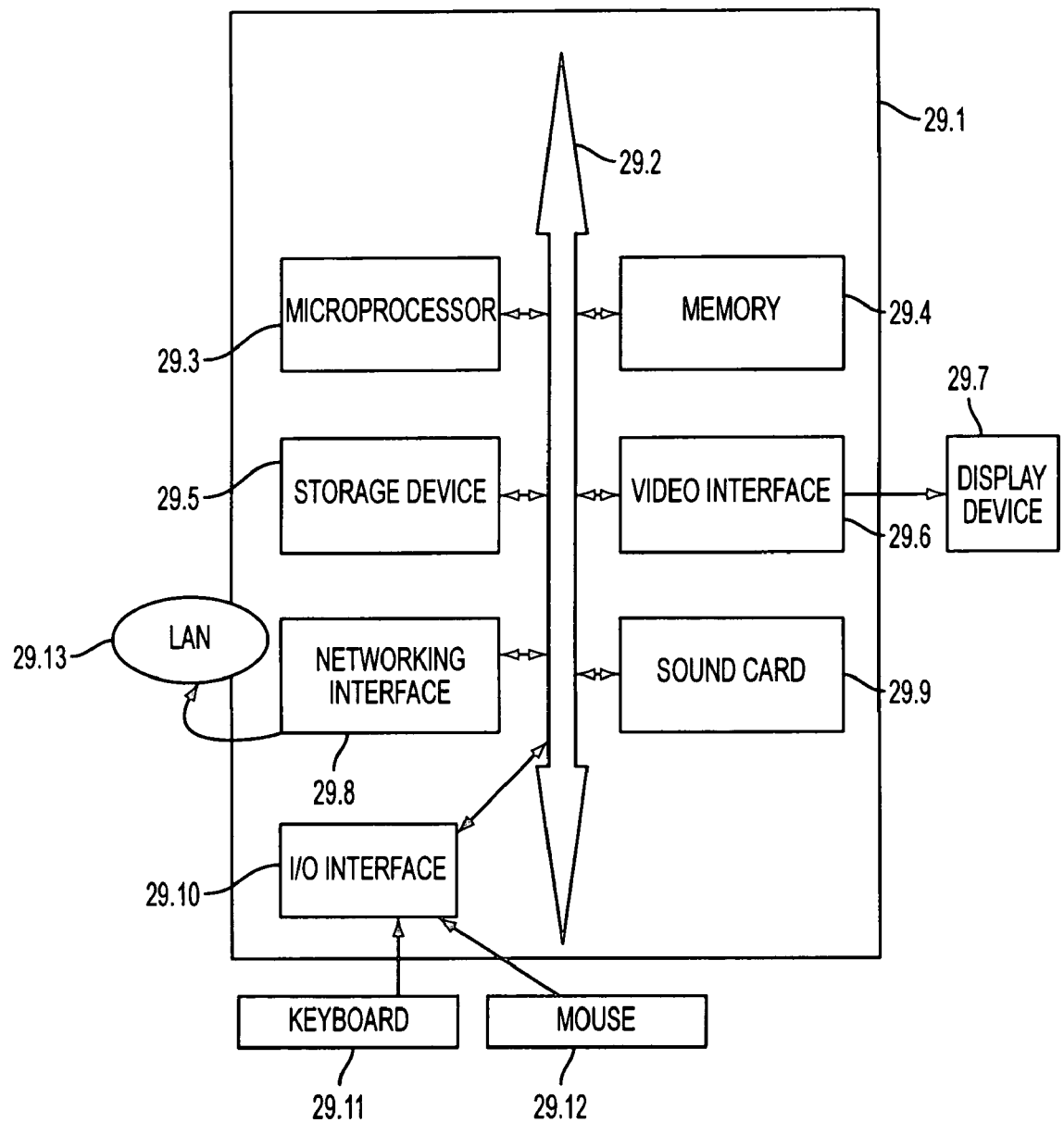

FIG. 29 is a block diagram of a data processing system that may be used to execute the sequential program in accordance with a preferred embodiment of the present invention.

DETAILED DESCRIPTION OF THE ACCOMPANYING DRAWINGS

The invention pertains to the area of parallel and distributed computing. It simplifies the way parallel and distributed applications are programmed. Simplification is achieved by obviating the need to write a parallel program in form of parallel executing processes. The system executes in parallel parts of a sequential program. Writing a parallel application involves great effort and skills on the side of programmer. Parallel programming involves extra programming load of data communication and inter-process synchronization. Program is to be divided into a set of collaborating processes or threads. Data is to be divided and then transferred from one process to another in an efficient manner, so as to maximize the performance. Synchronization between the processes is also to be taken care of. In case, the parallel execution is to be distributed over to other computers on the network, these computers must also be configured.

The invention provides a framework for executing a sequential program in parallel. To write a parallel application using the framework, parts to be executed in parallel are specified in the form of separate procedures marked as 'parallel'. Therefore, the granularity, i.e. the smallest part of the program that can be divided into parallel running fragments, is the part of the program written in parallel procedures. During execution, these parallel procedures are executed in parallel to rest of the program.

For achieving high performance, a parallel application is often distributed to various processing nodes in a cluster or on a network. For the parallel application to run successfully, these nodes need to be kept in isolation and have to be fully dedicated only for the parallel applications. A failure in any of the nodes may lead to the failure of the complete application. If the programmer has to incorporate fault tolerance, he has to further program by setting up the check points and writing code for the recovery from each checkpoint on a failure between the checkpoints.

The invention in addition to providing a framework for executing a sequential program in parallel also provides for automatic fault tolerance. The onus of writing code for fault recovery is not on the programmer but is taken care of by the framework itself. Automatic recovery from the fault without any extra effort on the part of the programmer is supported. (Many systems to detect faults already exist).

The framework supports dynamic resource (mostly processing units) addition. Applications made over this framework can also be executed over a network in use for other activities. Processing nodes that are used for other activities can also be taken in. As the system is fault tolerant, these nodes can go up and down not resulting in complete failure. On each failure system performance degrades gracefully. The parts of the parallel application can be executed as low priority processes running only when a node is idle and thus not interfering with the other activities on the node. These features make the invention one of the most cost-effective supercomputer that can be put on already built network of corporate offices, research and educational institutes.

Parallel procedure is specified at calling point by specifying parallel procedure ID and its arguments to the system. ID of the parallel procedure may be in the form of address of the procedure, or it can be any other ID that can be resolved to the address of the parallel procedure. It can be the name of the parallel procedure in a programming language system that allows resolving of procedures through their names. It can be any other symbol that the programming language system is able to resolve with the procedure. It can also be any other symbol explicitly bound in the program to the procedure. A symbol can be bound with the parallel procedure using a symbol table. In systems with extended compiler parallel procedure can be specified by declaring it as 'parallel'.

Data communication between the parallel executing processes is through the arguments to the procedure. Argument variables are replaced by objects of special wrapper synchronous classes to the argument data. These wrapper classes provide all the functionality and properties of argument data type and in addition take care of synchronization involved in transfer of argument variables' value. On running the program, the system executes the specified procedures in parallel to the rest of the program, giving the same result it would have given had the program executed sequentially.

Parallel procedures can be specified in the program to the framework in the following ways:

1. A job object corresponding to each call of the procedure is created. The ID of the parallel procedure and all its arguments along with their type are specified in the job. Job object is then set to execute the parallel procedure in parallel. Sample C++ code is as follows:

SynchronousInt*Argument1=new SynchronousInt;
   SynchronousFloat*Argument2=new SynchronousFloat;
   Synchronousint*Argument3=new SynchronousInt;
   Job1=Job.CreateJob (ProcedureID);
   Job1.AddArgument(Argument1, RETURNABLE);
   Job1.AddArgument(Argument2, NONRETURNABLE);
   Job1.AddArgument(Argument3, RETURNABLE);
   Job1.ExecuteParallel( );

In the code, job object is created by 'CreateJob' function, in which the ID of the parallel procedure is specified as 'ProcedureID'. Then the arguments 'Argument1', 'Argument2' and 'Argument3' are specified by passing them to job through 'AddArgument'. The second parameter to 'AddArgument' is the type of the argument to parallel procedure. Type of the argument is discussed later in the specification. The job is then set to execute in parallel with the call to 'ExecuteParallel'.

2. ID of the parallel procedure and all its arguments along with their type are specified to the framework through a single 'Execute parallel' function as:
/* in the main procedure */
SynchronousInt*Argument1=new SynchronousInt;
SynchronousFloat*Argument2=new SynchronousFloat;
SynchronousInt*Argument3=new SynchronousInt;
ExecuteParallel(ProcedureID, 3, Argument1, RETURNABLE, Argument2, NONRETURNABLE, Argument3, RETURABLE)

The job object is not required to be created by the programmer explicitly, the function 'ExecuteParallel' automatically creates it. The function is called by specifying the ID of the parallel procedure, that is, ProcedureID and its arguments 'Argument1', 'Argument2' and 'Argument3'. Second argument to 'ExecuteParallel' is number of arguments to parallel procedure.

3. Parallel procedure may be written by making a new class derived from a common class corresponding to each parallel procedure in the program. In the class, parallel procedure may be implemented by overriding a procedure of the base class. Its arguments may be in the form of member variables of the object. For each call to a parallel procedure, an object corresponding to the parallel procedure is instantiated; arguments are added to the object and it is set to execute the parallel procedure. A sample C++ code is given as follows:

```
class ParallelProcedureclass1 : ParallelProcedureClass
{
    SynchronousInt * Argument1;
    SynchronousFloat * Argument2;
    SynchronousInt * Argument3;
    void ParallelProcedure( );
}
/* in the main procedure */
ParallelProcedureClass1 ParallelProcedureObject;
ParallelProcedureObject.Argument1 = new SynchronousInt;
ParallelProcedureObject.Argument2 = new SynchronousFloat;
ParallelProcedureObject.Argument3 = new SynchronousInt;
```

ParallelProcedureObject.ExecuteParallel( );

A new class 'ParallelProcedureClass1' is derived from the predefined class 'ParallelProcedureClass'. The code of the parallel procedure is written in the class's overridden member function 'ParallelProcedure' and the arguments to the parallel procedure 'Argument1', 'Argument2' and 'Agument3' are specified as the class's member variables. The parallel procedure is executed by creating the class's object and calling the 'ExecuteParallel' function of the parallel procedure object.

4. The task of specifying parallel procedures may also be accomplished through the compiler. Any parallel procedure is specified using a keyword like 'parallel' in its declaration and can be called in the program similar to any other procedure. For each call to a parallel procedure, compiler automatically adds code to make a job object and executes it in parallel. Programmer's code is given as follows:
parallel void ParallelProcedure1(SynchronousInt*,SynchronousFloat*,SynchronousInt* );
/* in the main procedure */
SynchronousInt*Argument1=new SynchronousInt;
SynchronousFloat*Argument2=new SynchronousFloat;
SynchronousInt*Argument3=new SynchronousInt;
ParallelProcedure1(Argument1, Argument2, Argument3);

In the given code, the parallel procedure 'ParallelProcedure1' is specified by declaring it with the keyword 'parallel'. 'ParallelProcedure1' is then called like any other procedure in the program and it gets executed in parallel.

Figure 1:
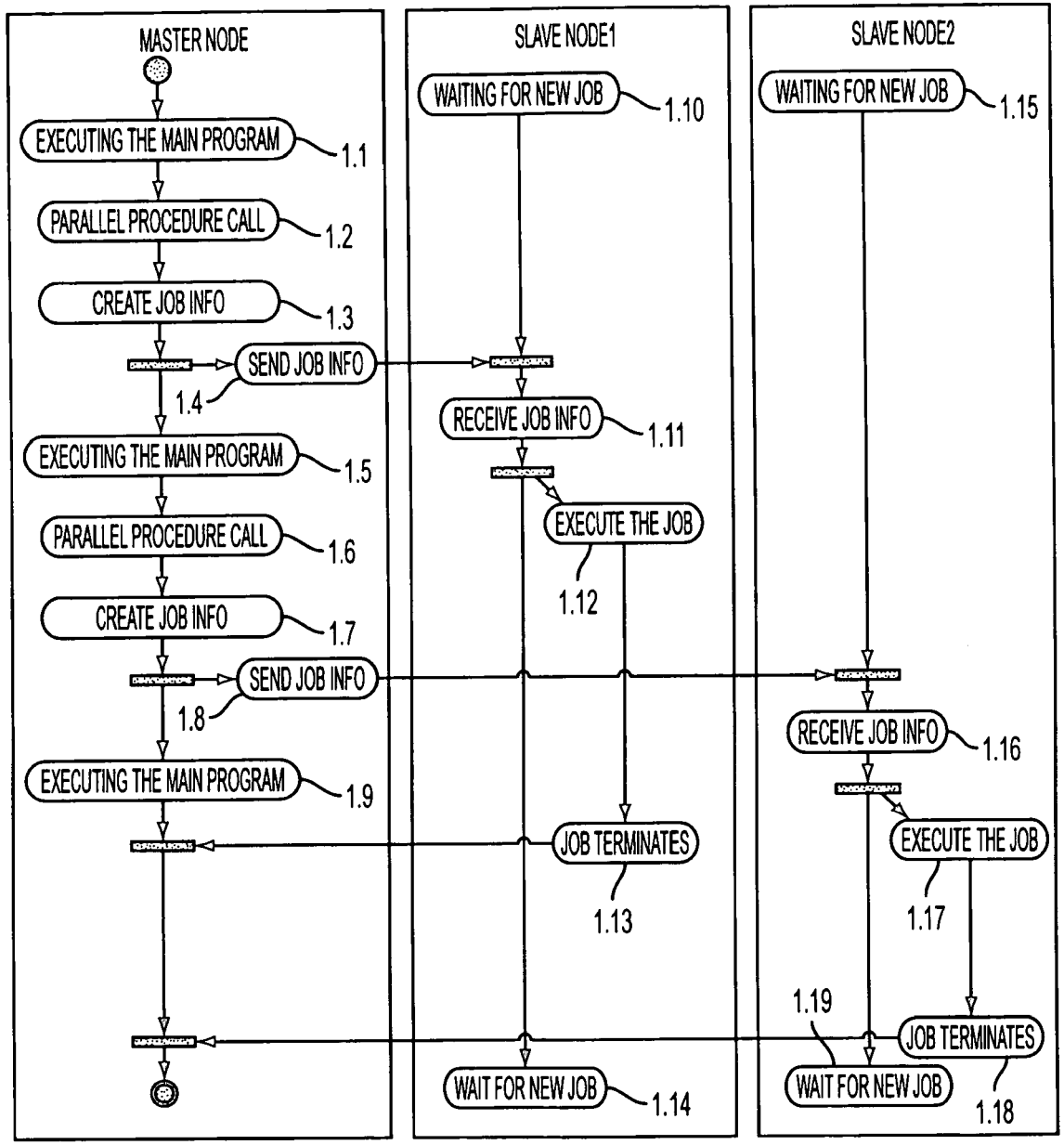
FIG. 1 is the activity diagram of sending two jobs to two processing nodes from a single process.

A parallel procedure executes as a slave process to the master process from which it is called. From within parallel procedures, any number of parallel procedures can be called. The calling process then acts as master to all the new processes formed. This is shown in FIG. 1, in which two parallel procedures are called resulting in their parallel execution. During the execution of the main program 1.1, a call to a parallel procedure is made 1.2. Subsequently, a job object is created 1.3 and the job info is sent to a slave node 1.4, where the slave process is to be executed. The process that had been waiting to receive a job 1.10 receives the job info 1.11 and executes the job 1.12 till it terminates 1.13. The completion message is then sent back to the master process. Meanwhile, the master process executing sequentially comes across another parallel procedure call 1.6 and creates the job object 1.7 to be sent to another or even same slave node, where it gets executed in the same manner as the other procedure execution on 'Slave Node 1'. After completing their respective procedure executions, both the slave nodes wait to receive more jobs 1.14, 1.19. The above diagram shows only two nodes for illustration purposes, the actual system may be comprised of at least one node each of which may be used by the master process to delegate the execution of parallel procedures. Any job can be run on any node of the system on which the required resources are available at that time.

Figure 2:
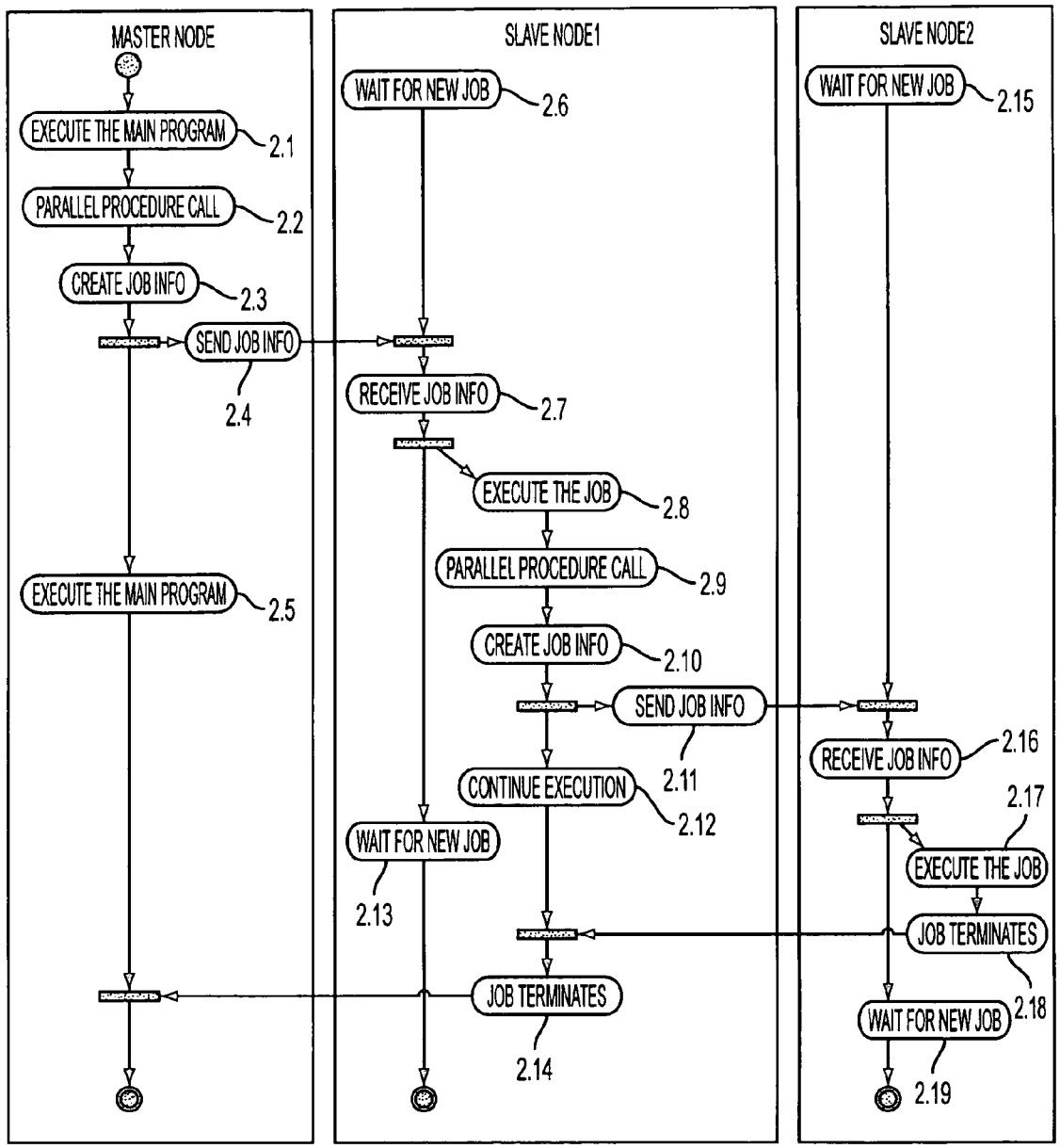
FIG. 2 is the activity diagram showing a slave process acting as master process by sending jobs to other processing nodes.

Within one parallel procedure, another parallel procedure can also be called with the newly spawned slave process also executing in parallel to rest of the program. Thus, a slave process of a process may be a master of others. This is shown in FIG. 2, in which a slave process on 'Slave Node 1' becomes a master of another slave process on 'Slave Node 2' as it transfers the execution of a procedure to the 'Slave Node 2'. The master node sends job info 2.4 about a parallel procedure to be executed to 'Slave Node 1'. Here the process that had been waiting for the info 2.6 begins job's execution 2.8 after receiving the info 2.7. During the procedure execution, a call to another parallel procedure is encountered 2.9. Consequently, the slave process creates new job info 2.10 for this procedure and sends it to 'Slave Node2' 2.11. Process on 'Slave Node 2' receives the info 2.16, executes the procedure 2.17 till it terminates 2.18. Subsequently, the slave process on 'Slave Node 1' completes the execution of the procedure sent to it by the master 2.14, subject to the condition that it may have to halt execution till its slave process on 'Slave Node 2' gets complete.

Data transfer between the master and slave processes is done through arguments passed to the parallel procedure. Data needed in the parallel procedure is put on the argument variables in the master process and any data needed from the parallel procedure is written back on the argument variables in the parallel procedure. Arguments can be passed as follows:

Arguments are for input [in] only. These are 'non-returnable', i.e., changes made in the parallel procedure to the arguments are not reflected back in the master process.

Arguments are for both input and output [inout]. These are 'returnable', i.e. changes made in the parallel procedure to the arguments are updated back in the master process after the completion of the parallel procedure.

Type of the arguments can also be determined at compile time. The compiler may determine whether or not arguments can be modified in the parallel procedure through a simple analysis of the control flow graph of the parallel procedure. If any of the argument cannot be modified, the argument type may be set as non-returnable else returnable.

For the program to give correct results, values of variables at any instance of accessing them must be consistent with values they would have, had the program been executed sequentially with no parallel procedure executing in parallel. In the parallel model, synchronization of data between master and slave processes is also to be taken care of. Variables sent as arguments in the parallel procedure may not have 'right values' in them at all instances during the execution. The 'right value' is what it would have got on sequential run of the program. For example, a parallel procedure is called and its 'returnable' argument is modified in it. As the parallel procedures execute in parallel to rest of the program, the argument variable may be accessed outside the parallel procedure before its completion. It may be accessed in the master process or it may be sent to some other parallel procedure also. Now, the value of the variable is inconsistent with the value it should have been, had the program been executed sequentially. Its value must be first updated back from the modifying parallel procedure and then only it must be accessed in other threads.

Following are the cases to be dealt with to achieve synchronization in the aforementioned model of parallel execution of a sequential program:

1. Master process accesses the data value that is sent as 'returnable' to the slave process still in execution. This is the case, when master process sends some 'returnable' data to the slave process and then tries to access it. The master process does not have the 'right value' as the parallel procedure is still in execution and can change the 'returnable' data.
2. Slave process accesses data value when it has not received the argument value from the master process as master was not having it at the point of calling the parallel procedure. Suppose, 'returnable' variable A is passed to job J1 and then to job J2. Now, since J1 and J2 execute in parallel, any changes made to variable A in J1 do not get reflected in J2 and therefore, J2 does not have the 'right value' of A.

The framework provides automatic synchronization without requiring any extra input in the program. No effort regarding data dependencies or synchronization between different processes is required to be made by the programmer; only the way arguments are passed to the parallel procedure is changed. Arguments are passed in the form of special synchronous objects, which encapsulate the data carried by the arguments. These synchronous objects act as wrapper objects around argument data.

Synchronous objects are instances of 'SynchronousObject' classes. If data of type 'signed integer' is to be sent as an argument to a parallel procedure, an object of 'SynchronousInt' class is instantiated and its reference is passed as argument to the parallel procedure. 'SynchronousInt' is wrapper class of 'signed integer'. New 'SynchronousObject' classes are made by deriving new classes from the 'SynchronousObjectBase' class provided by the framework. In-built wrapper classes of some basic data types are derived from 'SynchronousObjectBase' class only and custom 'SynchronousObject' classes can be similarly constructed. For example, if a complex number is to be sent to the parallel procedure, a new class is made by deriving it from the 'SynchronousObjectBase' class containing a real and an imaginary part.

The 'SynchronousObject' classes also support object creation on fly. In the slave process, the same copy of the object is not operated upon; rather a 'child synchronous object' of each synchronous object, which is passed as argument, is created. Child object in the slave process is a copy of the parent object passed as argument in the master process. All operations on the argument objects are done on slave process's local copy. If the object is passed as 'returnable' then after completion of the parallel procedure, object in the master process is updated back.

These wrapper classes provide all the properties and functionality of data-types, and in addition also provide for synchronization of data contained therein. Objects of these classes are built with the ability to block the thread accessing them, if they do not have the 'right values'. Objects release the blocked thread after they are updated with 'right values'. Thus, on accessing an argument in master or slave process, it is ensured that accessing process gets the 'right value'.

If a synchronous object does not contain 'right value', it is 'unavailable' to the process. The process gets blocked on accessing an 'unavailable' object. An object becomes 'available' to the process only after it is updated with the 'right value'. Following are the rules adhered to by the system to determine the availability and value transfer of a synchronous object:

A synchronous object is 'available' to the master process on creation, while a child synchronous object remains 'unavailable' to the slave process.

When an 'available' object is added to a job as 'returnable' during a call to the parallel procedure, object values are transferred to the slave process and the object becomes 'unavailable' to the master process.

When an 'available' object is added to a job as 'non-returnable', object remains available to the master process and object values are transferred to the slave process.

If an object, which is unavailable to master process, is passed as an argument to a parallel procedure, its value is not transferred till the process receives the object value from its own master if object is not created in the said process and from the slave processes created corresponding to all the parallel procedures, in which object is passed as 'returnable' and that are called before the said procedure.

An 'unavailable' object becomes available to the process only after the process receives the object value from its own master if object is not created in the said process and from the slave processes created corresponding to all the parallel procedures, in which object is passed as 'returnable'.

Value of the child synchronous object is transferred back to master process after the completion of parallel procedure, only after child object becomes available to the slave process.

Child synchronous object value may be transferred to the master process before the completion of the parallel procedure also; it can be transferred right after the execution of last modifying instruction on the object in the parallel procedure. The last modifying instruction may be determined by specifying it by the programmer by setting the object as 'over'; it may be determined by the compiler or it may be taken as the point of completion of the parallel procedure.

Since the accessing thread is to be blocked, if the object is 'unavailable', direct access to the data contained in a synchronous object is not given. Every object access is accompanied by a lock and a subsequent unlock of an 'accession lock' associated with each synchronous object. This 'accession lock' can be any synchronization object, like a semaphore, provided by the operating system. When the object is unavailable, its 'accession lock' is not free and process gets blocked when trying to lock it; resumed only after the object becomes 'available'. Thus, it is ensured that on accessing a synchronous object, the process gets the 'right value' only.

Figure 3:
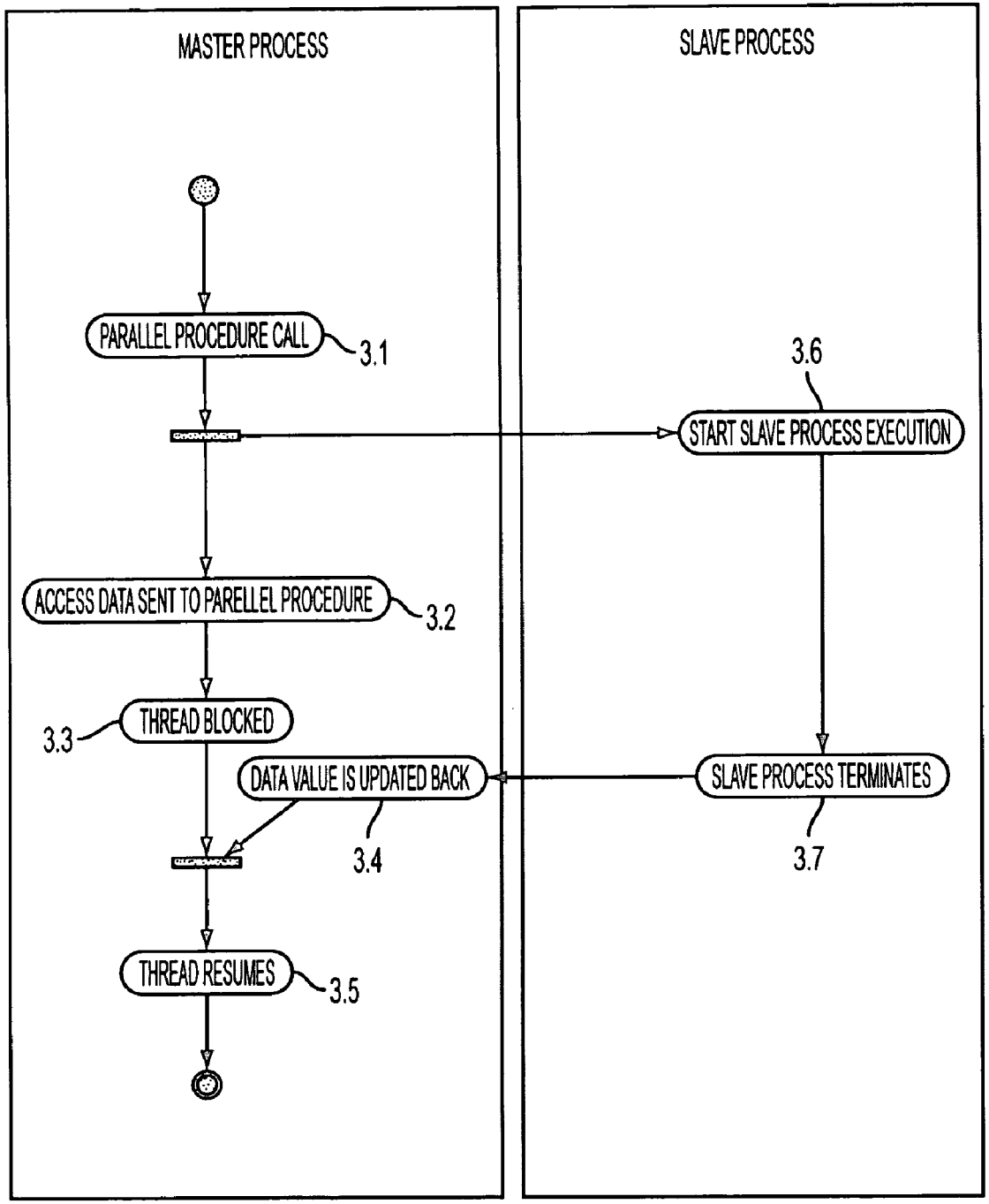
FIG. 3 is the activity diagram of the blocking of the master process if the unavailable synchronous object is accessed.
Figure 4:
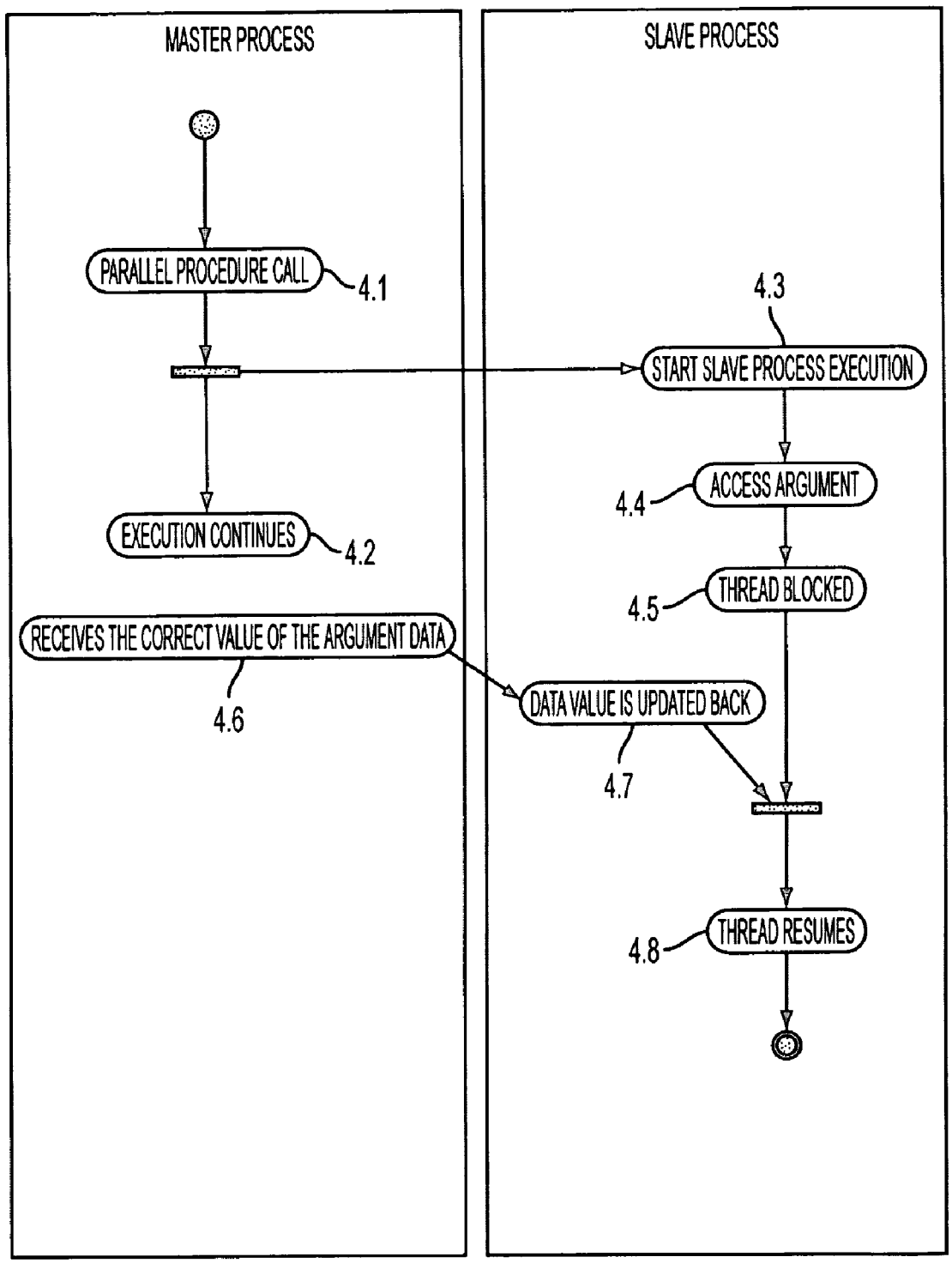
FIG. 4 is the activity diagram of the blocking of the slave process if the unavailable synchronous object is accessed.

FIG. 3 shows the blocking and resuming of the master process, when accessing the data sent as argument to a parallel procedure. When a call is made to the parallel procedure 3.1 in the master process, the required job info is sent and execution of the slave process 3.6 is started. If during the execution of this procedure, an object passed as an argument is accessed by the master 3.2, the process gets blocked 3.3. It resumes 3.5 only after the slave process terminates 3.7 and argument values are updated in the master 3.4. FIG. 4, similar to FIG. 3, shows the blocking and resuming of the slave process. When accessing the argument object 4.4, whose values have yet not been received, the slave process gets blocked 4.5. Its execution resumes 4.8 only after the master process receives the correct value of the object 4.6 and subsequently value of the object is transferred and updated in the slave process 4.7.

To implement the 'availability' of object as mentioned, a concept of 'ownership' of object is employed. In the process in which the object is created, the ownership of the object is with the process itself or with any of the jobs to which the object has been passed as argument or rather added to the job. Object ownership signifies who can modify the object in the process. Ownership with the process signifies that object is available to the process for modification. If object's ownership is with some job, then the object value is to be updated from the corresponding slave process and the object is 'unavailable' to the master process. In the slave process, ownership of an object can be with the 'source' corresponding to when object value is not received from master process.

Rules for ownership transfer in master process are as follows:

When a synchronous object is created, the ownership of the object is with the process itself.

When an object owned by the process is added to a job as 'returnable', the ownership is transferred to the job, the job gets added as the first element of an 'ownership queue' and the object value is transferred to the slave process.

When an object owned by the process is added to a job as 'non-returnable', the ownership remains with the process or is transferred to the job and immediately released by the job and the object value is transferred to the slave process.

When an object, which is not owned by the process, is added to a job, the job gets added in an 'ownership queue' of the object.

When a job releases the ownership of the object, the ownership is transferred to the first element in the ownership queue, the element is removed from the queue and the object value is transferred to the slave process. If the 'ownership queue' is empty, the ownership of the object goes back to the master process.

If the object has been added as 'returnable' in the owner job, the job releases the ownership of the object after object is updated back from the slave process.

If the object has been added as 'non-returnable' in the owner job, the job releases the ownership immediately as it gets it or the job gets bypassed in the ownership transfer process.

In slave process, following rules are followed:

When a child synchronous object is created in a slave process, ownership of the object is with the 'source' corresponding to master process when object values are to be received.

'Source', which may be considered a type of job object, releases the ownership of the object after value of the object is received from the master process.

After completion of the parallel procedure or end of all modifying operations on the synchronous object in the parallel procedure, the object is added to the 'source' corresponding to master process when object values are to be sent back i.

All rules regarding ownership transfer and 'ownership queue' are similar to that of master process.

In the ownership transfers involving job in which object has been added as non-returnable, an optimization is done. These jobs are bypassed during the ownership transfer and object values are transferred to the corresponding slave processes.

Implementation of ownership involves that every object maintains a list of an 'object info' structure. The structure contains a reference to the object; it also contains the status of the object with respect to the job, that is, whether the object values have been 'sent' to the slave process or not. If object is passed as 'returnable', the structure also stores if object value have been 'received' back from the slave process or not. Separate 'object info' lists are maintained for 'returnable' and 'non-returnable' objects. A single list can also be used with additional information about each object's type 'returnable' or 'non-returnable' in each element of the list. 'Object info' also has a pointer to the object's object info in the 'next owner' of the object in the ownership queue. If there is no next owner, the pointer is null. Object itself contains the pointer to the object's 'object info' in the current owner. Ownership queue of an object is nothing but this linking of the 'object info' corresponding to the 'current owner' with the 'object info' corresponding to 'next owner' and so on. In the queue, jobs get inserted and deleted by just changing the linkage of 'object info'.

Figure 5:
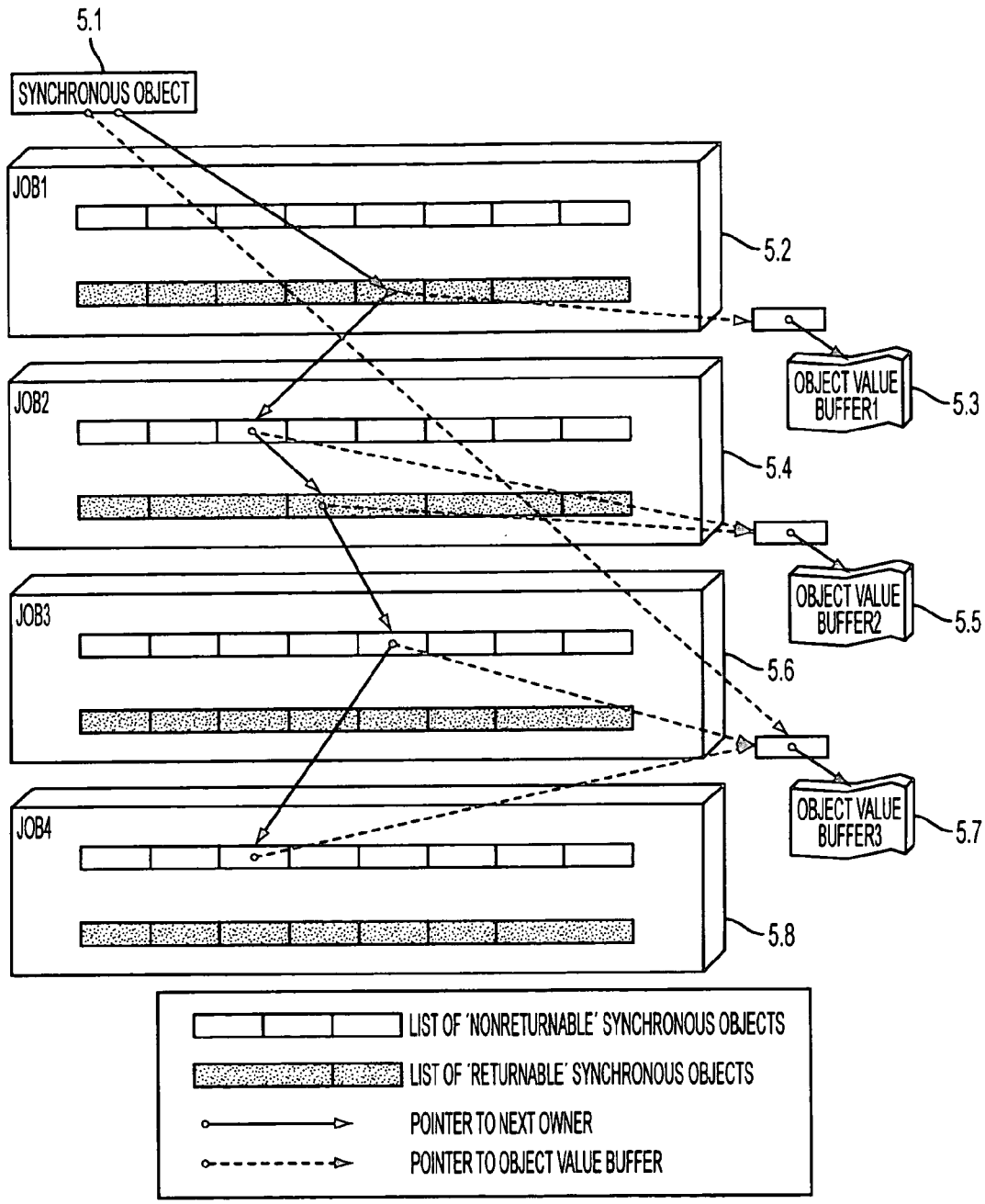
FIG. 5 shows the concept of ownership queue of the object and object value buffer maintained by each job.

FIG. 5 elaborates the concept of 'Object info' lists. In the figure, each job has two 'object info' lists associated with it; one list is used for objects passed as 'returnable' and the other for the 'non-returnable' object type. The sample synchronous object 5.1 is added as 'returnable' to Job1 5.2 and thus, object's 'current owner pointer' points to the 'object info' of the object in Job1. Also associated with 'object info' is the 'object value buffer' 5.3, which holds the actual value of the object when object ownership is transferred to the job. The 'object value buffer' is used for providing fault tolerance; this use is discussed later in the specification. The same synchronous object 5.1 is passed as both 'returnable' and 'non-returnable' to Job2 5.4 and therefore, it has entries in both 'returnable' and 'non-returnable' 'object info' lists of the job. 'Object info' in both the lists maintain a pointer to the same 'object value buffer' 5.5, as object value remains same for both 'object info'. Furthermore, the object 5.1 is passed as only 'non-returnable' to Job3 5.6 and Job4 5.8, hence it is added only in the 'non-returnable' list of these jobs. The 'object info' lists of both the jobs refer to the common 'object value buffer' 5.7 actual mechanism of sharing 'object value buffer' discussed later along with fault tolerance. Transfer of arguments involves that for each object, its type information is also transferred and the objects be created from the type information. Functionality of fetching run-time type information 'class info' and constructing object at fly can be in-built in the language. However, it can be easily implemented in conventional object oriented programming systems also. Every 'SynchronousObject' class contains a static procedure 'CreateObject' to create an object by the default constructor on the fly. The class also contains a static object of meta-class 'class info' along with a procedure that returns object of 'class info'. 'Class info' object stores pointer to 'CreateObject' and can be used to create synchronous object at fly. This 'CreateObject' procedure, 'class info' and the procedure returning the object of 'class info' can also be added in the class definition by adding a single macro only. Following is a sample C++ macro definition to be added in class definition:

```
#define DYNAMIC_CREATEClassName
static ClassInfo ClassInfoClassName::CreateObject;
virtual ClassInfo& GetClassInfo
{
    return ClassInfo;
}
static ClassName * CreateObject
{
    return new ClassName;
}
```

In order to transfer object value from one process to another, every synchronous object need to have procedures for serialization and deserialization. Serialization is the process of copying objects on a data stream. Deserialization is the process of updating the object by copying data from the data stream to the object variables. In the 'serialize' procedure, data in each variable in the object is copied to the 'argument stream' one by one. In the 'deserialize' procedure object is updated back by copying data from the 'argument stream' to the object variables in the same order. 'Argument stream' acts as an abstraction to the data stream. 'Serialize' is called when sending the value of a synchronous object and 'deserialize' is called when receiving and updating the value of the synchronous object. A sample code of serialize and deserialize procedure is given next.

```
Class NewSynchronousObject : BaseSynchronousObject
{
int Var1;
float Var2;
int Var3;
void serialize (stream ArgumentStream)
{
    ArgumentStream.serializeVar1;
    ArgumentStream.serializeVar2;
    ArgumentStream.serializeVar3;
}
void deserialize (Stream ArgumentStream)
{
    ArgumentStream.deserializeVar1;
    ArgumentStream.deserializeVar2;
    ArgumentStream.deserializeVar3,
}
}
```

Figure 6:
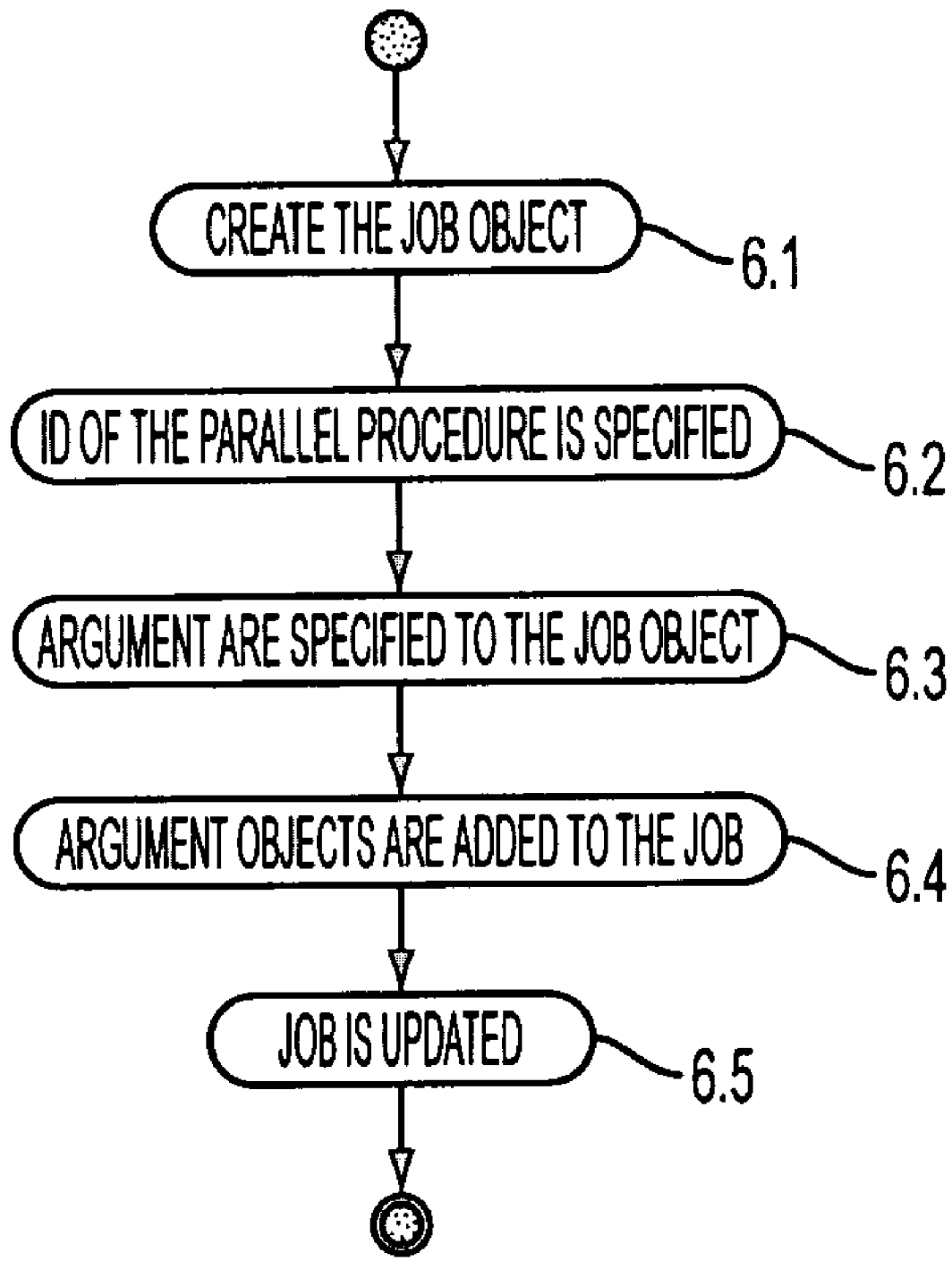
FIG. 6 is the activity diagram showing the construction of a job in the master process.

On a call to a parallel procedure, a job object is constructed as shown in detail in FIG. 6. Job object construction involves creation of the job object 6.1, passing ID the parallel procedure 6.2 to the job object, followed by specifying the procedure arguments to the job 6.3. As the framework is set to execute the job in parallel, these arguments objects are added object addition to job is explained earlier to the job object 6.4 and job object is updated 6.5 explained further.

After the creation of job object, a slave process is created and ID and arguments' 'class info' are transferred. Subsequently, child synchronous objects are created, their references are put on the process stack and parallel procedure is called. Parallel procedure takes its own course to complete.

After each synchronous object's class info has been transferred to the slave process and child synchronous objects are created, values of the objects owned by the job are sent. Object values of the rest of the objects are transferred to the slave process as the job in the master process gets their ownership. After the completion of the parallel procedure, value of data in 'returnable' objects is sent back to the master process to update back the parent objects.

Entire communication between any two nodes takes place though separate 'communication threads', and the job executing processes including master process are never blocked over I/O requests for master—slave communication. Communication threads support parallel transfer of data to more than one node, drastically improving distribution efficiency.

In many cases, a process may get terminated before it transfers object values to other processes slave or master. Following are the possibilities:

1. Slave process terminates after sending object received from its master process to its slave process for modification. The object must now be updated back on the said slave process and then to its master process. Suppose, a 'returnable' object A is sent to job J1 from where it is sent further to job J11 and the process executing J1 terminates before J11 completes, then the modifications in A done in J11 do not get reflected back in the master process of J1.

2. Master process terminates or object goes out of scope, before object value is to be transferred from one slave process to another corresponding to jobs in ownership queue. This case is only possible when the master process does not access the object after call to the parallel procedure; else the master process would have got blocked till the object value is received from all the slave processes. This may lead to blocking of slave processes indefinitely as it may never receive object value. Suppose, a 'returnable' object A is sent to job J1 and then to job J2, but the value of A is not yet transferred to J2. Now, if the master process terminates before transferring the updated value of A by J1 to J2, the value of object A gets never updated in J2.

3. Slave process terminates before receiving an object value from its master process. This case is only possible when the object is not accessed in the parallel procedure; else the slave process would have got blocked till object value is received from the master process. Suppose, a 'returnable' object A is sent to job J1 but its value is not transferred yet. Now, if A is not accessed in job J1 and it terminates before receiving the value of A from the master process, no process remains to receive value of A and then to transfer it back to master process so that job releases its ownership in the master process.

It is therefore the requirement, that object transferred must be maintained even after the process termination or object going out of scope. A synchronous object for the above reasons is not deleted until all object transfers have taken place through the process. Memory management of the synchronous objects is therefore not handled by the programmer. Synchronous object are not created on stack as they are required to be kept even after termination of a process or ending of scope of a program block. One way to accomplish it is that after a synchronous object is marked as 'over' explicitly by the programmer, when it is no longer required in the program; the system deletes the object after all the transfer processes have taken place involving the object.

The same result can also be achieved though automatic garbage collection. When an object becomes inaccessible in the program any references to the object ceases to remain, the object is automatically garbage collected. Since the framework also stores the object reference if the object is to be required in any object transfer, the object is deleted only after object transfers. In conventional systems, not supporting automatic garbage collection, automatic garbage collection can be achieved through a well known technique of reference counting using 'smart pointers'. Garbage collection through 'smart pointers' can be easily accomplished though software libraries. Each object maintains its reference count, which is adjusted for any reference modification. As the count becomes zero, the object is deleted Similar to arguments to a parallel procedure, the procedure's return value can also be synchronized. Synchronization on return value can be implemented on similar lines as that on 'returnable' objects, wherein a parallel procedure returns a reference to a synchronous object only. Container synchronous object of the return value can be specified to the job and the object can be added to the job in the same manner as a 'returnable' object is added. On completion of the parallel procedure, value of the return object is sent to the master process.

However, the above model is not capable of handling sequential programs wherein arguments may contain references or pointers to some other objects. If an object containing references to the data outside the object is sent to another process, then the data must also be transferred along as the data may be accessed in the slave process through the object. This transfer of data poses the problem of synchronization of this data also. This data can be referred through the references that are not in the object. After the data has been transferred to the slave process, one of its references remains in the first process. Two copies of the data, one in the master process and other in the slave process, can be modified independent of each other. Resulting in inconsistencies in data in one of the processes involved. However, if this data is also in the form of synchronous object, the synchronization problem gets solved automatically.

Figure 7:
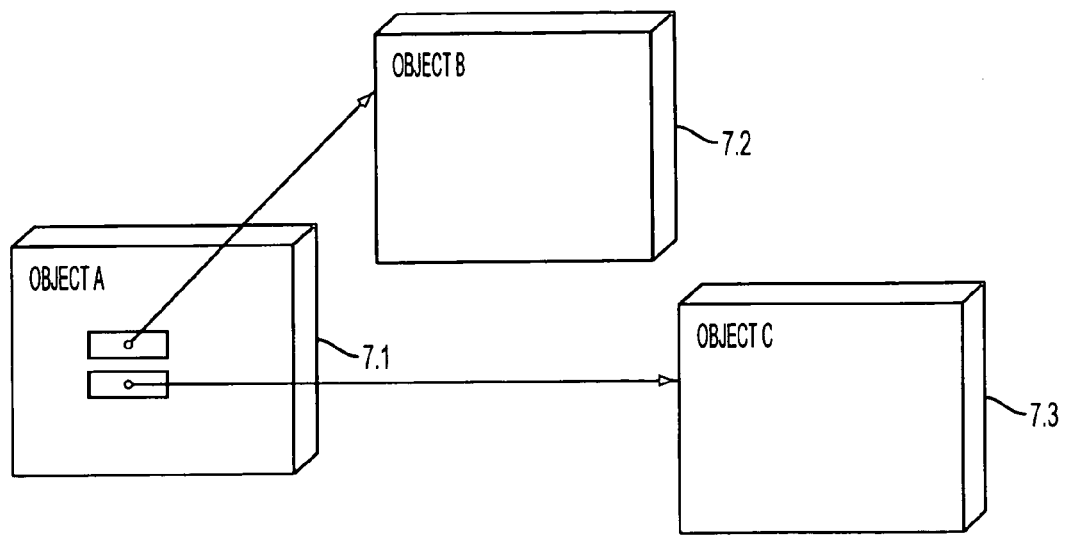
FIG. 7 shows the concept of reachability of two objects from a single object containing their references.
Figure 8:
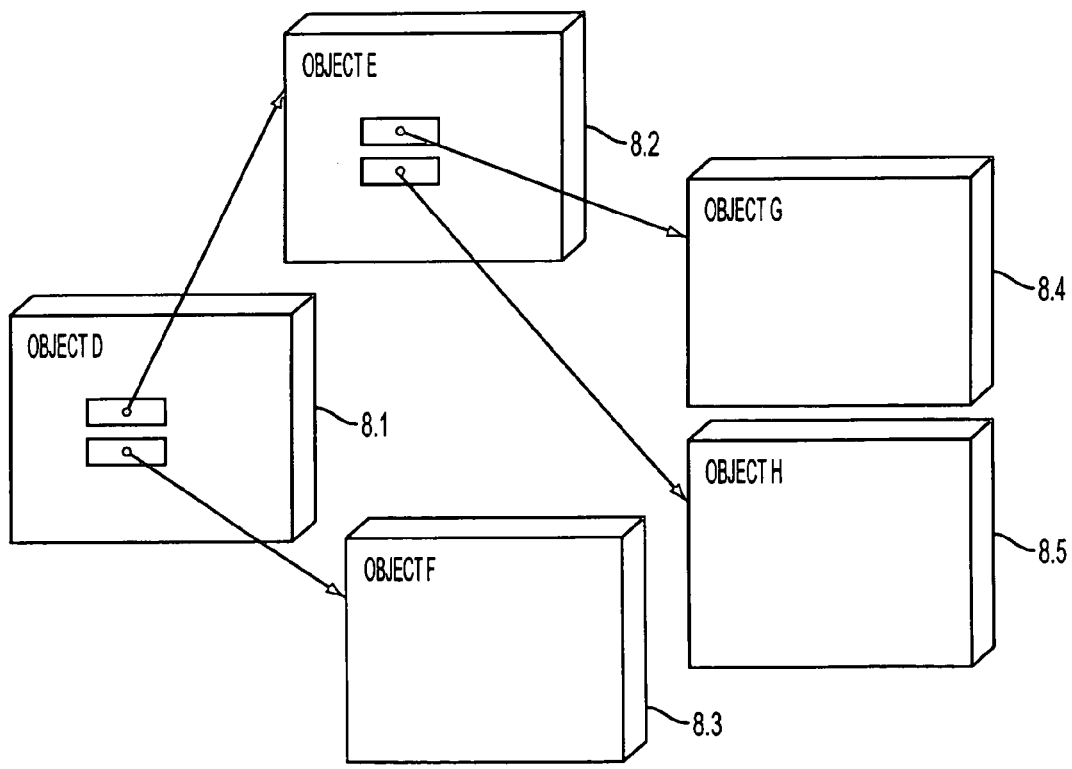
FIG. 8 shows the concept of reachability of objects from an object through another object reachable from the said object.

Synchronous objects may therefore contain references to other synchronous objects only. An object is reachable from another object, if the reference to the former object is contained in the latter or any other object reachable from the later object. In simple terms, a synchronous object A is reachable from another synchronous object B, if object A can be accessed in the program through object B. For instance, in FIG. 7, objects B 7.2 and C 7.3 are reachable from A 7.1. In FIG. 8, references of G 8.4 and H 8.5 are contained in E 8.2 and thus are reachable from E 8.2. E 8.2 and F 8.3 in turn are reachable from D 8.1 and so G 8.4 and H 8.5 are also reachable from D 8.1 also through E.

When an object is added to a job all the objects reachable from it are also added to the job. Similarly, if an object is transferred from one job to another, all the objects reachable from it are also to be transferred. As and when a synchronous object becomes owned by the job, its value is transferred to the slave process. An object, reachable from a 'returnable' object is treated as returnable, and an object, reachable from a 'non-returnable' object is treated as a 'non-returnable' in the job. Object values of all the reachable objects, which have been added as 'returnable', are also sent back to the master process on completion of the parallel procedure, corresponding objects in the master process are updated, and their ownership is released by the job. Ownership transfer of objects reachable from 'non-returnable' objects is also dealt with as that of 'non-returnable' objects.

When adding an object to a job, the framework does not have prior information about the references contained in the object, therefore it uses 'serialize' and 'deserialize' procedures of the object to gain this information. In 'serialize' and 'deserialize' procedure of a synchronous object, the references to synchronous objects contained in it are also passed to the argument stream in the same order. When the objects' 'serialize' procedure is called, references to synchronous objects, having their references in the object are added to the argument stream. Argument stream does not copy the reference value possibly the address of the object in the memory to any data stream, rather it passes the reference to the job. The object is added to the job in form of a new entry in the 'object info' list and object's serialize procedure is called again to gain information about the references further contained in this object. Thus, all objects that are reachable from an argument object get serialized recursively. After all objects reachable from any one argument object have been added, the same process is repeated for remaining objects. The following sample code illustrates a new synchronous object class that contains references to other synchronous objects.

```
Class NewSynchronousObject : BaseSynchronousObject
{
    SynchronousInt * Var1;
    SynchronousFloat * Var2;
    SynchronousInt * Var3;
    void serialize (Stream ArgumentStream)
    {
        ArgumentStream.serializeVar1;
        ArgumentStream.serializeVar2;
        ArgumentStream.serializeVar3;
    }
    void deserialize (Stream ArgumentStream)
    {
        ArgumentStream.deserialize Var1;
        ArgumentStream.deseriaiize Var2;
        ArgumentStream.deserialize Var3;
    }
}
```

In the code given above, the class NewSynchronousObjectClass is derived from BaseSynchronousObjectClass and contains other synchronous objects 'Var1', 'Var2' and 'Var3'. In the 'serialize' function, all the synchronous objects are passed to the argument stream and in 'deserialize' function, all the objects references are updated back from the argument stream.

To those in the ordinary skill in the art, it would be apparent that instead of 'serialize' and 'deserialize' a different set of procedure could also have been used. The functionality of fetching the linkage information of the object at run-time may also be added by the compiler.

Figure 9:
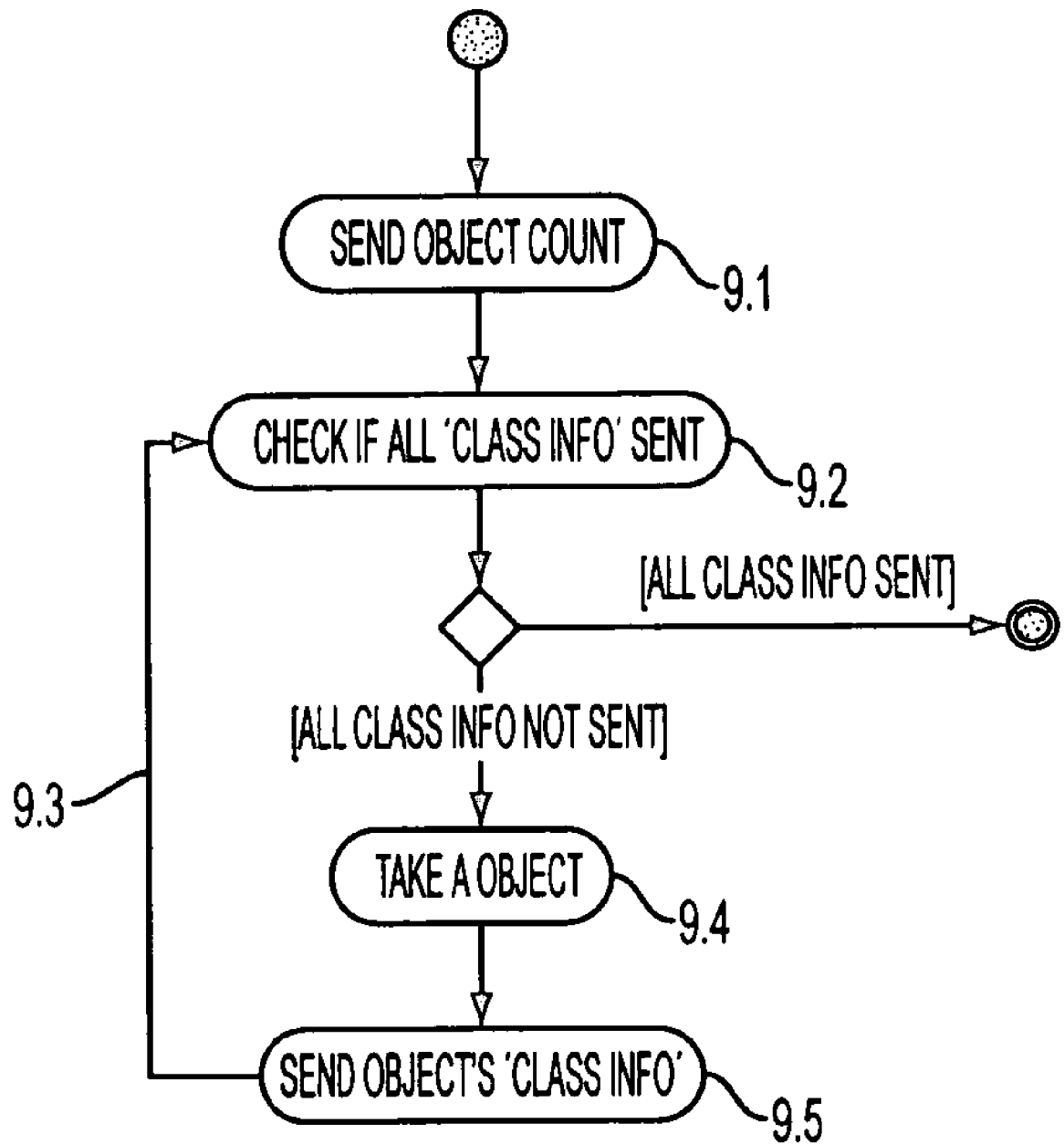
FIG. 9 is the activity diagram of sending the object list update from the master process.
Figure 10:
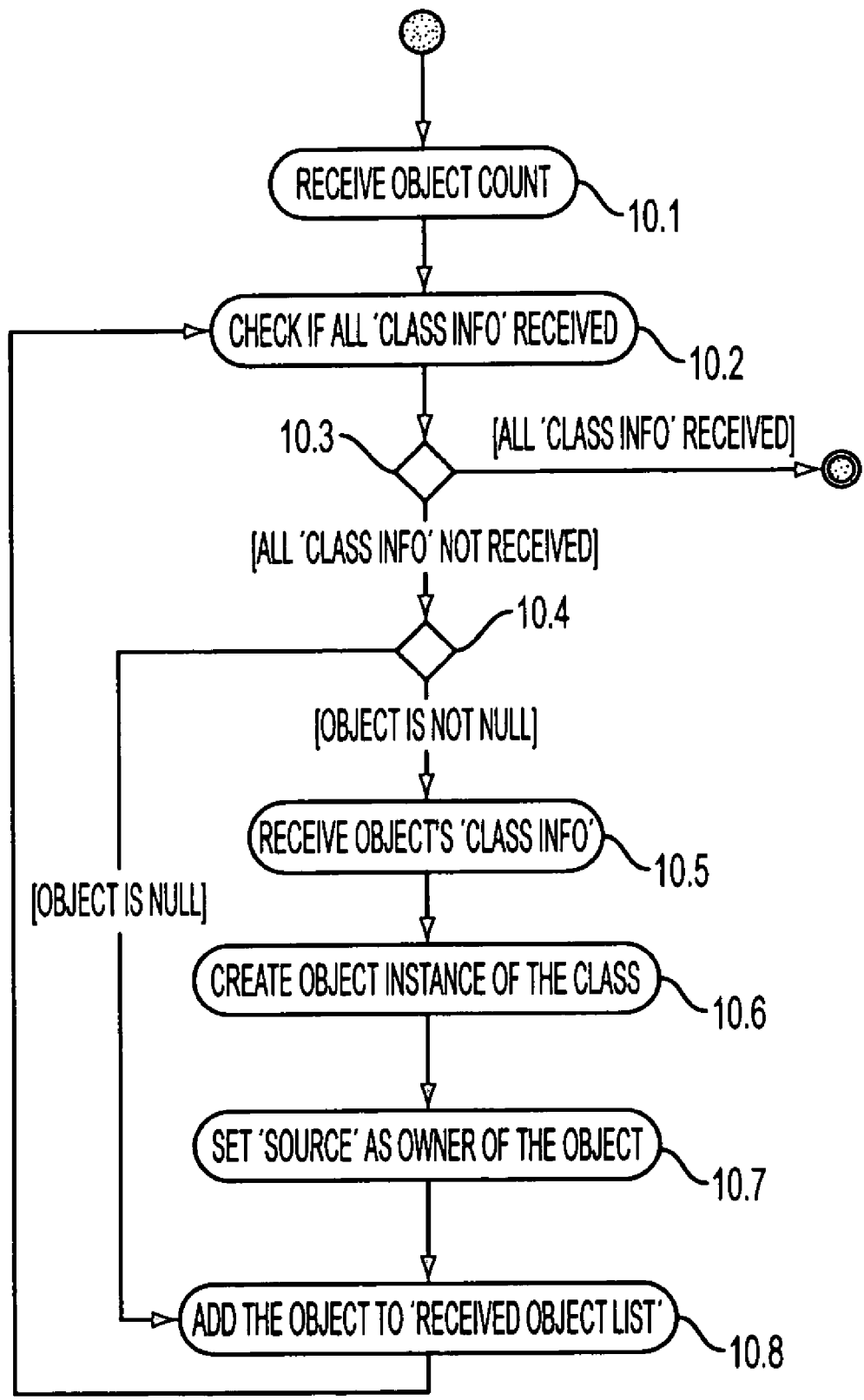
FIG. 10 is the activity diagram of receiving the object list update in the slave process.

'Class info' of each object in the 'object info' list is transferred to the slave process along with parallel procedure ID. FIG. 9 shows the process of sending object list updates from the master process in which 'class info' are transferred. First the object count is sent 9.1; it is followed by taking each object in the 'object info' list 9.4 and sending its 'class info' to the slave process 9.5 if object is not null. FIG. 10 shows the process of receiving object list updates in the slave process. Object count is received 10.1; for each object, it is checked if it is null or not 10.4; if the object is not null, 'class info' of the object is received 10.5, child object is created from the 'class info' 10.6, 'source' is set as owner of the object 10.7. In the slave process, reference of the child objects are stored in a 'received objects list' discussed later in the specification 10.8 in same order as its parent object in 'object info' list in the job in the master process.

References in the synchronous object are initialized to newly created objects. This is also done in the same recursive way, but this time through 'deserialize' procedure. In 'deserialize' procedure, argument stream updates the object references to the newly created objects. 'Deserialize' is called in the same order as serialize. Argument stream takes object reference from the 'received object list' and updates the references contained in the synchronous objects. As the order of deserialization is same as that of serialization and order of object in both 'received object list' in the slave process and 'object info' list in the corresponding job object in the master process is same, same objects similar to parent objects are linked together.

Object values are transferred from master process to the slave process as job gets their ownership. Value of all the objects available to the master process at the point of calling the parallel procedure is sent right away as job gets objects' ownership as they are added to the job. Along with each object's value its position in the 'object info' list in the job is also transferred. In the slave process, after getting the position of object same in the 'received object list', object value is deserialized to the corresponding object. Similarly, after the completion of parallel procedure, each 'returnable' object's value along with the object position in the 'received object list' is transferred back to the master process, as object becomes available to the slave process.

A reference to a synchronous object is link between the two objects. Link is directional and directed towards the referred object. When an object gets transferred from one process to another along with objects reachable from it, the linkage structure of the synchronous object is maintained, i.e. all the paths through which one object was reachable from another is maintained. To maintain this linkage structure, cross-references and circular references in the objects have to be specially taken care of. If the objects are assumed to be nodes of a graph and links connecting these nodes to be directional edges, then the cross reference corresponds to two paths to reach from one to another. Circular reference corresponds to a loop in the graph. A special consideration while handling cross-references and circular references in linkage structure is to avoid sending an object, reachable from other objects through more than one path, more than once.

Figure 11:
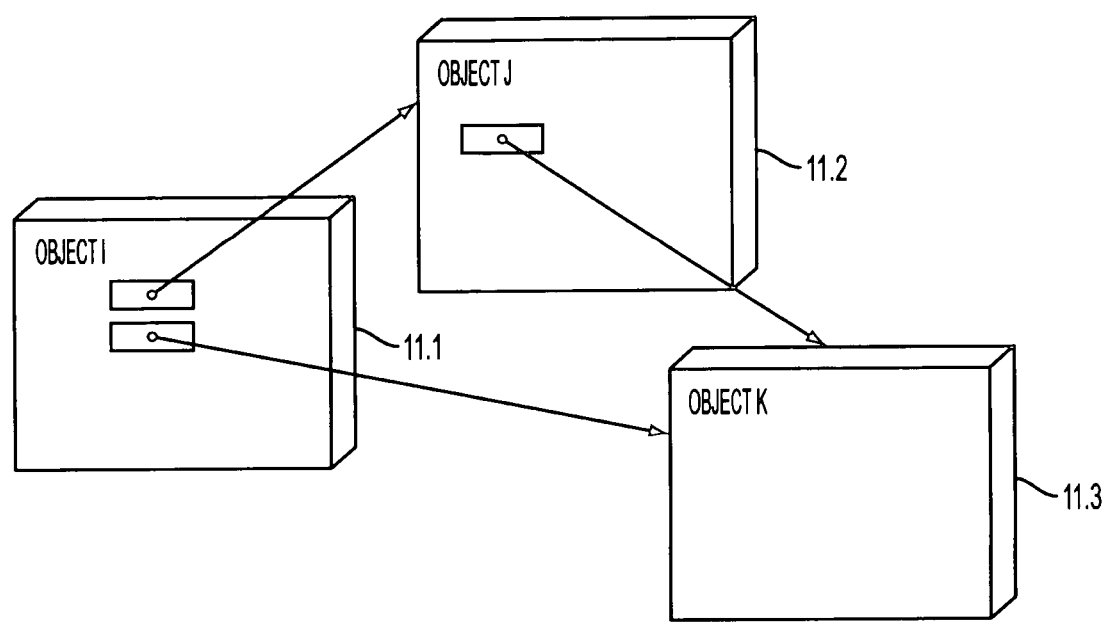
FIG. 11 shows the concept of cross-reference with an object reachable from another object by two paths.
Figure 12:
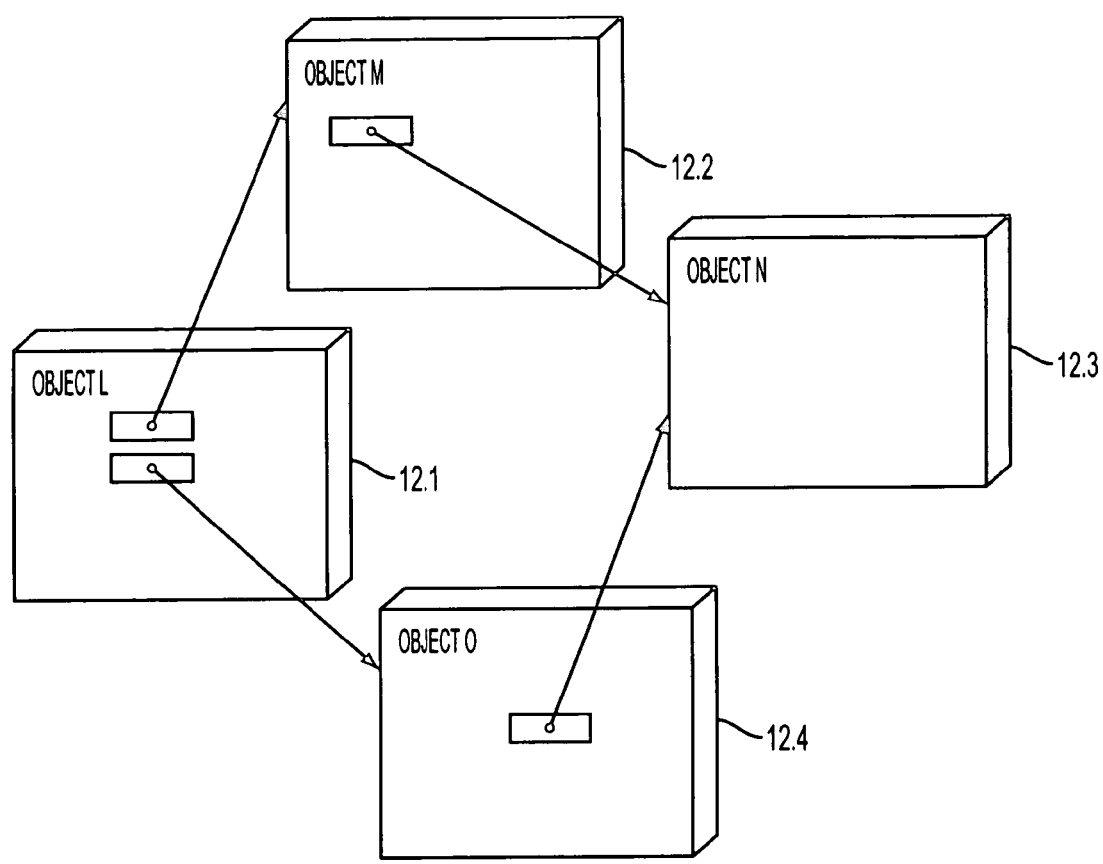
FIG. 12 shows the concept of cross-reference with an object reachable from another object by two paths both through the other objects.

Cross-reference can be illustrated in FIG. 11 and FIG. 12. In FIG. 11, object K 11.3 is reachable from object I 11.1 by two paths: one through J 11.2, which is reachable from I 11.1 and the other directly reachable from I 11.1. In FIG. 12, object N 12.3 is reachable from L 12.1 through two paths: one through M 12.2 and the other through O 12.4, with both M 12.2 and O 12.4 being reachable from L 12.1 directly as they are contained in it.

Figure 13:
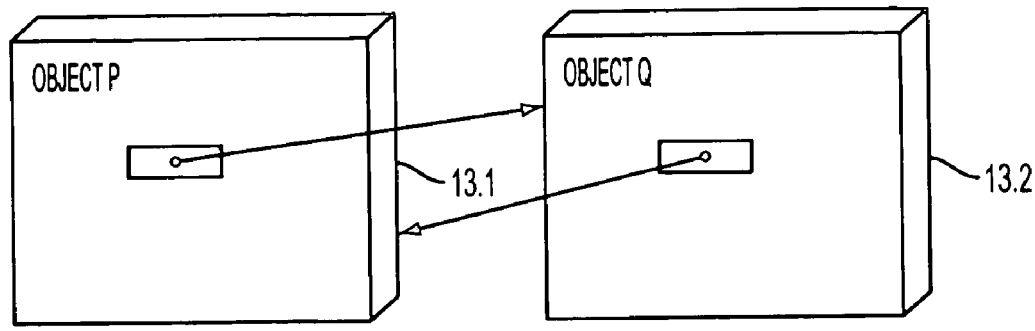
FIG. 13 shows the concept of circular-reference in two objects.
Figure 14:
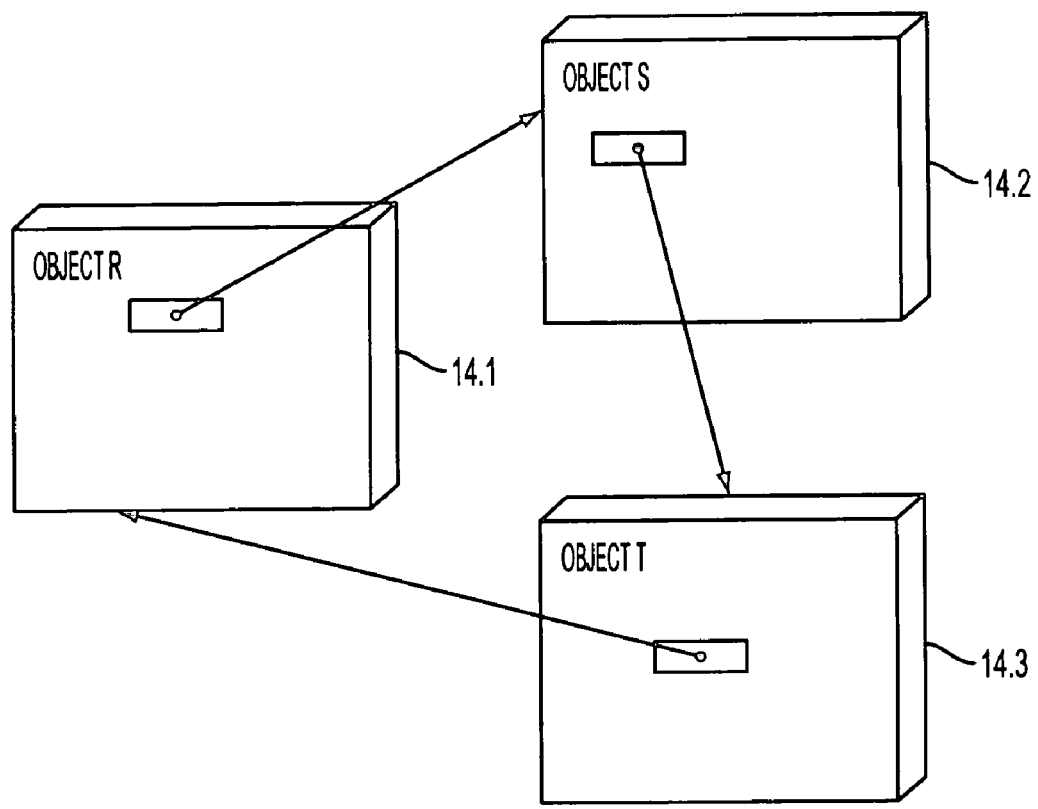
FIG. 14 shows the concept of circular-reference in three objects.

Circular reference linkage structures are illustrated in FIG. 13 and FIG. 14. In FIG. 13 both objects P 13.1 and Q 13.2 become reachable from each other. P 13.1 is reachable from Q 13.2 directly as its reference is contained in Q 13.2 and Q 13.2 is reachable from P 13.1 directly as reference of Q 13.2 is contained in P 13.1. In FIG. 14, object R 14.1 becomes reachable from itself due to the circular reference. The object S 14.2 is reachable from R 14.1 as its reference is contained in R 14.1. Furthermore, T 14.3 is reachable from S 14.2 and in addition, R 14.1 is again reachable from T 14.3, thereby completing the circular reference.

Adding objects to a job with cross-references or circular references is similar to adding an object as argument to the job more than once. If an object is added twice to a job with same type either both as 'returnable' or both as non-returnable, only one copy of object must be formed in the slave process. All the references of the object in the slave process must point to the same copy of the object. In case of cross-reference and circular reference, the object is added to job twice. In order to deal with multiple additions of objects, 'object info' also stores the first occurrence of same type of the object in the job object info list. When transferring object info list, first occurrence of the object is also transferred along with their class info. When creating child objects in the slave process, if the first occurrence position is not position of the object entry in the list, new instance of the object is not made corresponding to this entry and in the 'received object list', reference in the first occurrence position is copied at this position. Thus during deserialization, same object gets linked and linkage structure is maintained. If object is added twice with different types then two different copies are made in the slave process, as the two types have very different functionality and cannot be mixed by the framework.

Another problem that needs to be addressed is when linkage structure changes are made in the program. The above model of recursively adding the objects to the job fails when the references contained in the synchronous objects are altered. The model adds all the objects reachable from an added object irrespective of whether the object is available to be owned by the job at that point or not. References in the object may be modified before the object ownership is transferred to the job making the linkage structure in the process corresponding to the job inconsistent with what it should have been. The model even does not reflect linkage structure changes in one process to other. No information regarding any change of linkage structure is passed back to the master process, if some changes have been made in the slave process and therefore the changes do not prorogated to the jobs next in the ownership queue. If a new object is created in the slave process and gets included in the linkage structure of objects, which are to be updated back to master process, neither the new object's class info nor object's value or any info regarding linkage structure alterations is sent back. Modifications in the references contained in a synchronous object received from master process may include:

1. The reference is made null.
2. The reference is set to an object received from master process.
3. The reference is set to an object created in slave process itself.

Even if linkage information is sent back and corresponding new objects are created and linked in the master process, changes in the linkage structure may still not get reflected in the jobs ahead in the 'ownership queue'. For instance, a synchronous object A containing a reference to another object B is added to two jobs J1 and J2 as 'returnable'. A is now unavailable to J2 till J1 releases its ownership. In J1, reference to B may be modified to a new object C, created in J1 only. However in J2, along with A, B also got added, resulting in inconsistency in the linkage structure of A.

To deal with, referred objects are not added to a job till the job gets the ownership of the referring object. Delaying addition of referred objects precludes their premature addition, when the linkage structure is subject to changes, till the ownership of the referring object is transferred to the job.

This process of transferring ownership of objects and adding referred objects is termed as 'update' of the job further in the specification. 'Update' process is done when any of the added objects becomes available to be owned by the job. FIG. 15 demonstrates the process of 'update' of a job when an object becomes available. To implement delayed addition, each job maintains a 'new objects available list'. An object already added to the job gets added to the list as it becomes available to be owned by the job. If an object, when added to the job, is also available to be owned the job, it also gets added to the 'new object available list', else when the object becomes available later, it gets added. During 'update', the system checks for objects in 'new objects available list' 15.1. For each object in the 'new objects available list', it adds all the objects to the job that have their references in the said object and that have yet not been added to the job to check for circular and cross references 15.5. With the addition of referred objects, the referring object is deleted from the 'new object available list' 15.4. This process of adding as the, new objects that are added to the job may get added to the list, if available and removing objects continues till the 'new object available list' becomes empty. After an object is removed from the 'new objects available list', object is added to 'objects to be transferred list' 15.6. 'Objects to be transferred list' is the list of objects whose ownerships have been transferred to the job and their values are to be transferred to the corresponding slave process. The process of sending the value of objects in 'objects to be transferred list' is discussed later.

Master process maintains a 'jobs to be updated list'. 'Jobs to be updated list' contains jobs that have at least one object in their 'new objects available list'. i.e. those that are required to be updated. The system updates all the jobs one by one, removing their entry from the list as they are processed. Only when a job's 'new objects available list' is empty and an object gets added to it, the job gets added to the 'jobs to be updated list'. Thus, the job can get added to the list only when it is created and any of new objects added to the job is available to be owned by the job, or when an object's value update is received and object becomes available to be owned by the job.

The new approach of delayed addition of objects poses a new problem of keeping the order of ownership transfer of the objects consistent with the order of call to parallel procedure. Ownership of an object may get transferred to a job and subsequently its value may also be transferred before it is transferred to another job whose parallel procedure is called before. The ownership must actually be transferred to the jobs in the calling order of parallel procedures. To give an example, ownership of a synchronous object A containing a reference to another synchronous object B is released by job J1. If object B is already added to job J3 and object A to job J2, with J2 being called before J3, then B gets added to the 'new objects available list' of J3 and A gets added to the 'new objects available list' of J2, and both J2 and J3 are added to the 'jobs to be updated list'. Now, if J3 gets updated before J2, the ownership of B gets transferred to J3, and in J2, ownership of A gets transferred and object B gets added to the job, leading to inconsistency in ownership transfer and consequently in program flow also. However, if J2 would have been updated before J3, then after ownership of object A would have been transferred to J2, object B would have been added to J2, as well to the 'new object available list' of J2 and its corresponding entry in the 'new object available list' of J3 would have been removed, making B unavailable to J3 to own. Only after ownership of object B would have been released by J2, B's ownership would have transferred to J3. Thus by ensuring the update of jobs in the order of call to parallel procedures and by removing an object from the 'new object available list' of a job if the object gets added to another job whose parallel procedure is called before, the order of ownership transfer is kept consistent with the order of call to parallel procedures.

To keep the order of update consistent with the order of call to parallel procedure, jobs are numbered by 'call number' in the order in which their parallel procedures are called. Numbering is done during the creation of job object. And updating of the jobs is done in the order in which their parallel procedures are called, that is, in the order of their 'call number'.

In the case demonstrated above, it has been assumed that a job does not release ownership of an object till it releases the ownership of all the objects from which it is reachable. The setup would fail if ownership of an object were released before the release of ownership of the object from which it is reachable. Those with ordinary skill in the art would appreciate that the model already takes care of the condition, given the last modifying instruction is taken to be end of the parallel procedure. After the completion of parallel procedure, the slave process transfers object value as it becomes available to the process. Those with ordinary skill in the art would also be able to recognize the recursive relationship of the sequence of transfer of value of two objects when one is reachable from other and would be able to easily see that value of the object reachable from other cannot be transferred before the value of other. Similarly from master process also, value of the object reachable from other object cannot be transferred before the value of other.

Master process also maintains an 'objects to be freed list'. When value update of an object is received in the master process, the object is not freed, i.e., object does not become accessible to the process even if no next owner exists. Instead, it is added to the 'objects to be freed list'. After receiving an object value and release of ownership of the object by the corresponding job, all the jobs in 'jobs to be updated list' are updated. When no job is left to be updated, all the objects in 'objects to be freed list' are made 'available' to the master process. Reason for not freeing the object is that in the process of updating jobs, the object may be added to another job and therefore must not be made 'available' to the master process. When the job gets added to another job, it gets removed from 'objects to be freed list'.

This process is illustrated in the activity diagram in FIG. 16. To begin with, a job is taken from the 'jobs to be updated list' 16.1 and is deleted from the list 16.2. The job is then updated 16.3. Same process is repeated till 'jobs to be updated list' becomes empty. Thereafter, all the objects in 'objects to be freed' list are set as 'available' 16.5 that is available to the master process as their accession locks are unlocked 16.6. 'Objects to be freed list' is emptied 16.7 next.

To further elaborate the process, an example is provided as follows: Suppose, synchronous objects A and B are sent to job J1 as returnable, and object A is also added to job J2. In job J1, B becomes reachable from A, that is, its reference is put in A. After job J1 releases the ownership of A and B. B is added to the 'objects to be freed list' and is not made available to the master process. However, object A is added to the 'new objects available list' of J2. So, J2 gets added to the 'Jobs to be updated list'. When J2 is updated, object B also gets added to job J2 resulting in it being removed from the 'objects to be freed list'. Thus, B is not made available to the master process.

The process of insertion of job in the 'ownership queue' of the object after addition of the object in the job is illustrated in FIG. 17. First, object's 'availability' to the master process is checked 17.1; if the object's is 'available' 17.2, its 'accession lock' is locked so that object is no longer 'available' to the master process and it is added to the job's 'new objects available list' 17.9; if the object is 'not available' 17.2 to the master process, it is checked if the object is added to any job or not 17.3. If the object is not 'available' to the master process and also not added to any job, it is surely present in the 'objects to be freed list', from where it is removed now 17.8; and is then added to the job's 'new objects available list' 17.9; if the object is added to some job, the job is inserted into the 'ownership queue' of the object 17.4; position of insertion in the 'ownership queue' is found 17.5 using job's 'call number'; if the job is inserted at the first position in the 'ownership queue', the object is removed from the 'new objects available' list of the job before which the new job is inserted 17.10 and is added to the 'new objects available' list of the new job 17.9.

FIG. 18 illustrates the operations done on the object's ownership after an object is set as 'sent' its ownership is gained by a job and its value is sent. First, the type 'returnable' or 'non-returnable' of the sent object is checked 18.2. If the object is added as 'non-returnable', its next owner is found 18.3; if there is no next owner of the object, then object's current owner is set to null 18.6 and object is added to the 'objects to be freed list' 18.7; if there exists a next owner of the object, it is made as the current owner 18.4 and object is added to this job's 'new objects available' list 18.5. And in case object is added as 'returnable' no operation is done.

FIG. 19 illustrates the operations done on the object's ownership after an object is set as 'received' objects value is updated and its ownership is released by the job. First, the next owner of the object is found 19.1. If there is a next owner of the object, it is made as the current owner 19.3 and object is added to this job's 'new objects available list' 19.4. If there is no next owner of the object, object's current owner is set to null 19.5 and object is added to the 'objects to be freed list' 19.6;

As the objects referred from an unavailable object are not added to the job till the object becomes available, they cannot be added to the job recursively depth first. First, all the objects referred from an object in the 'new object available list' are added to the job and then new objects added to the 'new objects available list' are opened further. This is effectively adding of the objects in breadth-first manner.

Order in which objects are added to the job is not fixed, as it depends on whether the referring object is available or not at the point of its addition to the job. It is also subject to changes in the linkage structure of the object. Since the order of addition of objects is not fixed, an extra data structure containing the linkage information of objects is stored in the 'object info'. This data structure is a 'link info list'. An element in the 'link info list' in object's 'object info' contains position of referred objects in the 'object info' list.

As a new object is added to the job, an entry of the object's position is made in the 'link info' list in the 'object info' of the referring object. If an object has already been added to the job and is again passed to the argument stream case when object is referred from more than one object, then only the entry corresponding to the new link is made in the 'link info list' of the referring object's 'object info' in the job. For example, if an object A contains a reference to object B. Both A and B are passed as arguments to job J1. If B gets added to the job before A and A becomes available to the job later, then rather than adding B again A refers to B, only an entry corresponding to the position of B in the job is made in the 'link info list' in A's 'object info'.

FIG. 20 shows the above process of adding an object to a job. First, it is found if the object is already added to job or not by finding the previous occurrence of the object in the 'object info' list 20.1; if previous occurrence is found, 'object info' of the previous is used 20.4; else new 'object info' is added in the job's 'object info' list 20.3; then the referring object's position in the 'object info' list association information in the figure is found 20.5 and position object, which is being added, is added in the 'link info list' in referring object's object info 20.6; and then the job is added to the ownership chain of the object 20.7. Addition of job in ownership chain has discussed earlier in the specification.

While returning objects back to master process from the slave process, a similar approach to that employed in master process is applied. In the slave process, a 'return object list' of objects is built on the similar lines as 'object info' list in each job in the master process; each element of the list is similar to 'object info'. After completion of the parallel procedure or after the last modifying instruction on the object is executed, all the 'returnable' objects received from the master process their references are present in received object list are 'added' to the list. A job object corresponding to master process 'source' is made as object values are now to be transferred to master process. 'Return object list' is actually an 'object info' list in 'source' job object, which is always the last owner of the object in the slave process. As the ownership of an object is transferred to 'source' job, object value is transferred to the master process. Similar to the jobs in master process, a 'new objects available list' is also maintained in 'source' object. 'Source' object also gets added to 'jobs to be updated list' and is always updated in the last as other jobs.

In the new model proposed, not only object update transfer but 'class info' transfer or object list update and object value transfer also includes link info transfer may take place multiple times. As ownership of any object gets transferred to a job, which may get transferred when constructing the job or when ownership of an object is released by a job just ahead in the 'ownership queue', new objects may get added to the job. Object value of the newly owned object and list update corresponding to newly added objects are transferred. Always, object list update transfer precedes object value transfer. This ensures that position contained in the 'link-info list' of each object is a valid object position in the receiving process, that is, the referred objects are created in the receiving process before references in the referring object are initialized.

Object list updates in master and slave process is explained as follows. The process of transferring object list updates from master process is shown in FIG. 9 and that of receiving these updates in the slave process is shown in FIG. 10. From the slave process also, object list updates are to be sent, as new objects created in slave process may be required to be passed to the master process. FIG. 21 clearly depicts all the steps involved in transferring object list updates from slave process to master process in process. First the object count is sent back to the master process 21.1. Then for each object in the slave process, if object is received from the master process, its 'class info' is not transferred back to master process object are already created in master process;

just its position in the job is sent back 21.6; and if object is not received from the master process object created in slave process and linked to an object received from the master process, only its 'class info' is transferred 21.5. The process of receiving object list updates from the slave process in master process is shown in FIG. 22. In the master process, after receiving the object count 22.1, for each object received, it is checked if the object is new object instance created in slave process or not 22.4; if the object is new, it is checked if the object is null or not 22.5; if the new object is not null then object's 'class info' is received 22.6, object is created in the master process 22.7, 'source' is set as its owner 22.8 and then the object's accession lock is locked till its value is received from slave 22.9; if the object is not new then the object's position in the job is received 22.11. In the master process, a 'returned object list' is made, in which references of all the objects are stored 22.10. This list is used to resolve references from one object to another, as is 'received object list' used in the slave process. Order of object in the list in the master and in the slave process is maintained same.

Object value updates in master and slave process is explained as follows. After an object is removed from the 'new objects available list', object is added to 'objects to be transferred list'. 'Objects to be transferred list' is the list of objects that have become available to the job and their value is to be transferred to the slave process. Transferring of values of all the objects from the master process is illustrated in FIG. 23. Object value update count is sent first 23.1. Then position of each object in the 'objects to be transferred list' is sent one by one along with its type 'returnable' or 'non-returnable' 23.6. Subsequently, contents of each object are serialized to the argument stream 23.7 and value serialized in the argument stream and linkage information of the object is transferred 23.8. Linkage information of an object is transferred in the form of a list containing position of the referred objects in the job. After transferring all the values to the slave process, 'objects to be transferred list' is made empty 23.4. The process of receiving object value and link info from master process in slave process is shown in FIG. 24. First, object value update count is received in the slave process 24.1. Then for each object, its position in the job is received 24.4 and the object to be deserialized is chosen accordingly. Subsequently object value and link info are received 24.5 and object is deserialized 24.6 and object status is made 'received' release of ownership takes place.

FIG. 25 shows the process of sending object value and link info from slave process, which is similar to process described by FIG. 23, except that instead of sending the object's position in the job, slave process sends back the object's position in the 'return object list' similar to 'object info' list 25.6. FIG. 26 shows steps involved in receiving object values and link info from slave process in the master process, which is similar to process described by FIG. 24, except that instead of using 'received objects list', master process uses 'returned object list' 26.4.

Distributed systems are prone to network failures and computer shutdowns and crashes. The invention provides automatic fault tolerance, wherein the programmer is relieved from writing code for fault detection and recovery. Fault detection is trivial and can be easily done by pinging nodes at regular intervals; the master process can also verify if the slave process to which it transferred parallel procedure execution is running as normal or not.

There can be three types of faults: process failure faults, node failure fault or a network failure fault. 'Process failure' is abnormal termination of any of the executing processes. If a process gets abnormally terminated, the master process can throw the job again. Thus, a recovery from a 'process failure' is possible by simply rescheduling the process again on the same or any other node. A 'node failure' can be recovered from, by rescheduling each of the processes executing on it to other nodes. FIG. 27 demonstrates a 'node failure' scenario. In the figure, failure of Node3 occurs while executing Job2 27.15 assigned by the process executing on Node1. On detection of failure of Node3 27.5, Job2 is rescheduled to run on Node2. Master process maintains complete job object till values of all the 'returnable' objects are received by it. In case of any failure in the execution of the slave process, the job can be rescheduled using the job object. The process of rescheduling a slave process is similar to the process of scheduling the process for the first time. Again same parallel procedure ID, list of arguments objects, 'class info' of already added objects, and object value and linkage information of available objects is resent to the slave process 27.10 in the same fashion. Subsequently, the job2 executes on the Node2 27.12 from the beginning.

Since 'returnable' objects are not 'available' to the master process till the completion of parallel procedure, their data content remains intact. However, 'non-returnable' objects can be modified. Therefore, to support re-execution of parallel procedure, value of objects added as 'non-returnable' need to be stored linkage information is already stored in the object info. Whenever a value of an object, which is added as non-returnable to the job, is transferred to the slave process, it is serialized to a buffer also. During rescheduling, object's value is transferred directly from the buffer.

A fault may also occur when updating a 'returnable' object on master process while the object is updated only partially, destroying the data content of the returnable object to be used for rescheduling. Therefore, 'returnable' objects also need to be serialized to the buffer. Another scenario where 'returnable' objects need to be serialized is when a fault occurs between two object updates on the master process. Few objects may get completely updated and their ownership may be released by the job, while the rest of the objects may still be owned by the job, waiting to be updated. After ownership is released by the job, the objects in the master process may be modified. However, for rescheduling the slave processes in the event of some failure, the object's value that needs to be transferred is the one that it had at the point of calling the parallel procedure initially. Therefore, objects added as 'returnable' are also serialized in the buffer.

Rescheduling processes may lead to the problem of double updates of 'returnable' objects in the master process. One update can be from the original process and the other from the rescheduled process. To handle this problem, the job object maintains information about the status 'sent' or 'received' of the object; if the object has been 'received', new object updates are discarded.

Storing each object in the buffer may lead to unacceptably high memory usage. If an object is not modified between two calls to parallel procedures and has been added as non-returnable to the first job, only a single copy of the buffer may be used by both the jobs, to reduce the memory usage, since the object value does not get modified between the calls to the parallel procedures. As a further extension, an 'object value buffer' may be shared between the jobs in which the object has been added as 'non-returnable' consecutively and the first job in which object is added as 'returnable' thereafter, given the object is not modified in the process between these calls.

To implement common 'object value buffer' when object has same value in more than one call to parallel procedures, buffer of each object is kept separate in the job, with each 'object info' holding a pointer to the 'object value buffer' corresponding to the job. In case of a common buffer, they point to the same buffer. Beside the 'object info', object itself also contains pointer to the 'object value buffer' made during last serialization operation on the object. In addition, object also contains a flag, which is 'true' only when 'object value buffer' pointed by the object contains object's current value, that is, object has not been modified after the last serialization operation. When any modification is made to the object, the flag is set to 'false' and when object is serialized, when added as 'non-returnable', the flag is set as 'true', and when added as 'returnable', the flag is set 'false'. If object value is sent with the flag being set as 'true', new buffer is not made and the same buffer is reused by making the 'object info' in the new job to refer to the same buffer; buffer pointer is simply copied from the object. If the flag is set as 'false', a new copy of the buffer is made and subsequently, the buffer pointers, both in object and 'object info', are changed to the new buffer. FIG. 15 demonstrates a sample case when an object is added to multiple jobs and how 'object value buffer' is used.

FIG. 28 depicts a pictorial representation of a network of data processing systems in which the present invention may be implemented. Network data processing system contains a network 28.1, which is the medium used to provide communications links between various nodes connected together within network data processing system. Network 28.1 may include connections, such as wire, wireless communication links, or fiber optic cables.

In the depicted example, a node executing the master process 28.2 is connected to the network 28.1. In addition, other nodes 28.3, 28.4 and 28.5 are also connected to network 28.1. These nodes 28.3, 28.4 and 28.5 may be, for example, personal computers, network computers or any other type of processing unit. In the depicted example, the node executing the master process 28.2 creates the jobs and sends them to the slaves 28.3 and 28.4 for execution. The slave nodes 28.3 and 28.4 may further transfer the execution of new jobs to some other slave nodes 28.5 or among themselves.

Network data processing system may include additional computing systems and other devices not shown in the depicted example. In the depicted example, network data processing system is built over a typical Local Area Network with network 28.1 representing a collection of networks and gateways that use the TCP/IP suite of protocols to communicate with one another. Of course, network data processing system may also be implemented over a number of different types of networks, such as for example, a high-speed network connecting coupled memory—processor sets, a wide area network WAN, or even may be extended to the Internet. FIG. 28 is intended as an example, and not as an architectural limitation for the present invention.

FIG. 29 is a block diagram that illustrates a typical device incorporating the invention. The device or a processing unit 29.1 consists of various subsystems interconnected with the help of a system bus 29.2. Each device 29.1 incorporates a storage device 29.5 that is used to store the sequential program and means for executing it in parallel.

Those of ordinary skill in the art will appreciate that the means to execute the program are instructions for operating on the nodes of the system. The means are capable of existing in an embedded form within the hardware of the node or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:

a. Conversion to another language, code or notation.

b. Reproduction in a different material form.

At the computer system executing the master process, the keyboard 29.11, mouse 29.12 and other input devices connected to the computer system through the I/O interface 29.10 are used to input the sequential program wherein the parts of the program to be executed in parallel as 'parallel procedures' are specified. Following this the program is executed and the instructions encoded in the means to execute the program in parallel are transferred from the storage device 29.5 to the memory 29.4, which holds the current instructions to be executed by the processor 30.3 along with their results, through the internal communication bus 29.2. The processor 29.3 executes the instructions by fetching them from the memory 29.4 to create jobs for each call to a parallel procedure. The computer system either executes the job by itself or uses the networking interface 29.8 to send the jobs to the target nodes over a network such as LAN 29.13. At the slave node, the job is received over the LAN 29.13 through the networking interface 29.8 and the processor 29.3 executes the job.

Those of ordinary skill in the art will appreciate that the hardware depicted in FIG. 29 may vary. For example, other peripheral devices, such as optical disk drives and the like, also may be used in addition to or in place of the hardware depicted. It is important to mention that number of processors may also be more than one, making it a multiprocessor device. The depicted example is not meant to imply architectural limitations with respect to the present invention.

The computing environment also provides for interface to its administrator through a Process viewer. The Process viewer is an application started by the registry service at startup and is responsible for showing the state of execution of the programmer's application at any moment of time. It shows all the information about the nodes involved in the distributed processing. The information may include its hardware information or resource availability on the each computing node. The process viewer can also be used for getting the information about each process running on the system along with its ID, its priority, state ready or suspended, its execution time etc. The process viewer can also be used to control the distribution of processes and to suspend processes or forcing process distribution to a particular node or set of nodes.

It is important to note that while the present invention has been described in the context of a fully functioning data processing system, those of ordinary skill in the art will appreciate that the present invention is capable of being distributed in the form of computer instructions forming a computer program in which these instructions may be embodied on various computer readable media. The present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

We claim:

1. A method for executing a sequential program in parallel on a system containing a plurality of processing nodes connected through an interconnection network, comprising the steps of:
    segmenting the sequential program into multiple processes that are to be executed in parallel on different processing nodes,
    establishing dynamic master slave relationships between processes to be executed in parallel based on the program flow requirements,
    creating a job corresponding to each relation between a master and slave process,
    creating and forwarding synchronous objects as arguments to each job, wherein said synchronous objects enable blocking of the master process only when the object is being accessed by the slave process and allow access by the master process at intermediate paints of execution when the object is not being accessed by the slave process,
    scheduling the job along with values of said arguments on a processing node and executing said job as a slave process on the processing node, and
    receiving result of the job execution from the slave process on completion.

2. The method as claimed in claim 1 further comprising the step of providing automatic fault tolerance in an event of failure of a slave process, node or network involving:
    storing object value during their transfer to the slave process in a buffer,
    rescheduling the slave process on the same or on a different processing node, and
    transferring the stored value of the objects from the buffer to the slave process.

3. The method as claimed in claim 2 wherein the object buffer is shared with buffer corresponding to a previous call to a parallel procedure, if object is added as non-returnable in the previous call and no modification to the object is made in between the calls.

4. The method as claimed in claim 1 wherein the step of creating and forwarding synchronous objects includes the use of references as arguments or return value to a parallel procedure.

5. The method as claimed in claim 1 wherein an executing slave process creates and forwards a new job for parallel execution on a different node together with synchronous objects as arguments, said new job executing as a slave process and the initiating process acting as the master process.

6. The method as claimed in claim 1 wherein an argument is of type 'returnable', when modifications made to the synchronous object in the parallel procedure are reflected back, and is of type 'non-returnable', when no modification is to be reflected back.

7. The method as claimed in claim 1 wherein said synchronous objects are derived from a special in-built wrapper class that is provided for encapsulating data synchronization features for each regular data type of a target language as well as custom data types defined by a programmer.

8. The method as claimed in claim 7 wherein the functionality of wrapper classes of any data type that is passed as an argument to a parallel procedure is added automatically at compile time.

9. The method as claimed in claim 1 wherein the step of scheduling the job at the selected processing node comprises the steps of:
    providing a job information header,
    providing a type information of each object added to said job
    instantiating objects in the slave process from the type information provided, and
    sending values of said arguments to the slave process as and when owned by the job.

10. The method as claimed in claim 1 wherein each synchronous object has an associated access control mechanism for ensuring that it is accessible only by the process to which it is currently available.

11. The method as claimed in claim 10 wherein the availability sequence of an object is defined by an 'ownership queue' associated with said object, in which the 'current owner' of the object is the first element in the queue and subsequent elements are jobs awaiting ownership of the object, with ownership being transferred to each job in the sequence of the ownership queue and finally to the executing process, with said jobs being inserted in the queue if the object is added to them.

12. The method as claimed in claim 11 wherein on transfer of ownership of the object to a job, in which the object has been added as 'returnable', the object values are transferred to the corresponding slave process and the job remains the object's 'current owner' and after receiving the object value from the process corresponding to the. 'current owner' the job releases ownership of the object.

13. The method as claimed in claim 11 wherein on transfer of ownership of the object to a job, in which the object is added as 'non-returnable', the object values are transferred to the corresponding slave process and ownership of the job is immediately released.

14. The method as claimed in claim 11 wherein the 'ownership queue' an object is linking of object's entry in the jobs to which object has been added in the order in which object ownership is to be transferred, with insertion of jobs in the queue involves only modifying the appropriate links.

15. The method as claimed in claim 11 wherein during said transfer of ownership, the jobs in which the object is added as 'non-returnable' are bypassed and the object value is transferred to the slave processes corresponding to the bypassed jobs.

16. The method as claimed in claim 1 wherein said object when passed as an argument to a parallel procedure can refer to other synchronous objects with the synchronization done over the value of referred objects also and the linkage structure maintained for each object in the slave process.

17. The method as claimed in claim 16 wherein an object reachable from an object added to the job as 'returnable' is also added to the job as 'returnable', while an object that is reachable from an object added as 'non-returnable' is added as 'non-returnable', with the value of the referred objects being synchronized by also adding them to the job.

18. The method as claimed in claim 16 wherein the linkage structure of objects is maintained by:
    making an entry of each referred object, which is added to the job, in the object information list in the job,
    storing the link information of objects within the object information list in the form of an index of objects' entry in the object information list,
    sending the object information list to the process corresponding to the job, and
    linking the newly created objects in the like manner.

19. The method as claimed in claim 16 wherein the linkage structure of the objects can be altered in the program with changes in linkage structure being reflected in a the processes where the object is transferred and synchronization being maintained in accordance with the new linkage structure.

20. The method as claimed in claim 19 wherein reflecting linkage structure changes and maintaining synchronization comprises the steps of:

adding objects referred by a object only after ownership of the referring object is transferred to the job, maintaining the order of ownership consistent with the call order of parallel procedures in the master process, sending the a information of the referred objects and linkage information of the referring object to the process corresponding to the job as the referred object are added to the job, and creating the objects from the received type information and linking them with the corresponding referring object there.

21. The method as claimed in claim 20 wherein maintaining the order of ownership transfer consistent with the call order of parallel procedure involves:

holding the transfer of the ownership of a referred object till the ownership of the referring object gets transferred and its referred object added to the job thereafter, if the call order of the next owner of the referred object is greater than that of the referring object, and inserting the job, to which referred object is added, in between the ownership queue of the object such that job sequence in the ownership queue is consistent with the call order of the corresponding parallel procedures.

22. A system for executing a sequential program in parallel on a system containing a plurality of processing nodes connected through an interconnection network, comprising:

a central processing unit, a system bus a communication unit connected to the system bus, and a memory connected to the system bus, containing:

means for segmenting the sequential program into multiple processes that are to be executed in parallel on different processing nodes, means for establishing dynamic master slave relationships between processes to be executed in parallel based on the program flow requirements, means for creating a job corresponding to each relation between a master and slave process, means for creating and forwarding synchronous objects as arguments to each job, wherein said synchronous objects enable blocking of the master process only when the object is being accessed by the slave process and allow access by the master process at intermediate points of execution when the object is not being accessed by the slave process.

means for scheduling the job along with values of said arguments on a processing node and executing said job as a slave process on the processing node, and means for receiving result of the job execution from the slave process on completion.

23. The system as claimed in claim 22 further comprising means for providing automatic fault tolerance in the event of failure of a slave process, node or network by rescheduling the slave process on the same or different processing node.

24. A computer program product comprising computer readable program code stored on computer readable storage medium embodied therein for executing a sequential program in parallel on a system containing a plurality of processing nodes connected through an interconnection network, comprising:

computer readable program code means configured for segmenting the sequential program into multiple processes that are to be executed in parallel on different processing nodes, computer readable program code means configured for establishing dynamic master slave relationships between processes to be executed in parallel based on a program flow requirements, computer readable program code means configured for creating a job corresponding to each relation between a master and slave process, computer readable program code means configured for creating and forwarding synchronous objects as arguments to each job, wherein said synchronous objects enable blocking of the master process only when the object is being accessed by the slave process and allow access by the master process at intermediate points of execution when the object is not being accessed by the slave process, computer readable program code means configured for scheduling the job along with values of said arguments on a processing node and executing said job as a slave process on the processing node, and computer readable program code means configured for receiving result of the job execution from the slave process on completion.

25. The computer program product as claimed in claim 24 further comprising computer readable program code means configured for, providing automatic fault tolerance in an event of failure of a slave process, node or network by rescheduling the slave process on the same or different processing node.

* * * * *